US012627114B2

(12) United States Patent
Hosokawa et al.

(10) Patent No.: US 12,627,114 B2
(45) Date of Patent: May 12, 2026

(54) ACTIVE ELEMENT ADDED-OPTICAL FIBER, PREFORM FOR ACTIVE ELEMENT ADDED-OPTICAL FIBER, RESONATOR, AND FIBER LASER DEVICE

(71) Applicant: FUJIKURA LTD., Tokyo (JP)

(72) Inventors: Tsukasa Hosokawa, Chiba (JP); Rintaro Kitahara, Chiba (JP); Ryoichi Nishimura, Chiba (JP)

(73) Assignee: Fujikura Ltd., Tokyo (JP)

( * ) Notice: Subject to any disclaimer, the term of this patent is extended or adjusted under 35 U.S.C. 154(b) by 1004 days.

(21) Appl. No.: 17/632,400

(22) PCT Filed: Feb. 22, 2021

(86) PCT No.: PCT/JP2021/006695
§ 371 (c)(1),
(2) Date: Feb. 2, 2022

(87) PCT Pub. No.: WO2021/192783
PCT Pub. Date: Sep. 30, 2021

(65) Prior Publication Data
US 2022/0271494 A1     Aug. 25, 2022

(30) Foreign Application Priority Data
Mar. 27, 2020     (JP) ................................. 2020-059175

(51) Int. Cl.
*H01S 3/16*          (2006.01)
*H01S 3/067*         (2006.01)
*H01S 3/094*         (2006.01)

(52) U.S. Cl.
CPC ........ *H01S 3/1618* (2013.01); *H01S 3/06716* (2013.01); *H01S 3/06729* (2013.01); *H01S 3/094007* (2013.01)

(58) Field of Classification Search
CPC .. H01S 3/06716; H01S 3/067; H01S 3/06733; H01S 3/0675; H01S 3/0804;
(Continued)

(56) References Cited

U.S. PATENT DOCUMENTS

| | | | | |
|---|---|---|---|---|
| 5,778,129 A | * | 7/1998 | Shukunami | ......... H01S 3/06708 385/127 |
| 9,128,237 B2 | * | 9/2015 | Mukasa | ............. G02B 6/02047 |

(Continued)

FOREIGN PATENT DOCUMENTS

| | | | | |
|---|---|---|---|---|
| EP | 1506443 B1 | * | 3/2007 | ......... G02B 6/03638 |
| EP | 3462553 A1 | | 4/2019 | |

(Continued)

OTHER PUBLICATIONS

Arima_English, arima translation (Year: 1993).*

(Continued)

*Primary Examiner* — Minsun O Harvey
*Assistant Examiner* — Alexander Ehrlich
(74) *Attorney, Agent, or Firm* — Osha Bergman Watanabe & Burton LLP

(57) ABSTRACT

An active element added-optical fiber includes a core, having a radius d and including a first region and a second region, and a cladding that surrounds an outer peripheral surface of the core without a gap and propagates light in a few mode. The first region is a region from a central axis of the core to a radius ra and contains ytterbium as an active element. The second region is a region to the radius d that surrounds the first region without a gap and contains a plurality of dopants, one of which is germanium. The active element is not added to a region within the second region from a radius rc to the radius d. The germanium is not added to a region within the first region from the central axis to a (Continued)

radius rb, and a concentration of the germanium is highest among the plurality of dopants.

19 Claims, 14 Drawing Sheets

(58) Field of Classification Search
CPC ............. H01S 3/1618; H01S 3/093007; H01S 3/06708; H01S 3/08045; H01S 3/175; H01S 3/09408; H01S 2301/03; G02B 6/02042; G02B 6/0281; G02B 6/036
See application file for complete search history.

(56) References Cited

U.S. PATENT DOCUMENTS

| | | | | |
|---|---|---|---|---|
| 2005/0111500 | A1* | 5/2005 | Harter ................... | H01S 3/0057 372/18 |
| 2011/0142083 | A1 | 6/2011 | Tanigawa et al. | |
| 2014/0341238 | A1* | 11/2014 | Kitabayashi ............ | H01S 3/067 372/6 |
| 2019/0052043 | A1 | 2/2019 | Jollivet et al. | |

FOREIGN PATENT DOCUMENTS

| | | | | |
|---|---|---|---|---|
| JP | H01-145881 | A | 6/1989 | |
| JP | 05119222 | A * | 5/1993 | ....... C03B 37/01807 |
| JP | H05-119222 | A | 5/1993 | |
| JP | H06-157064 | A | 6/1994 | |
| JP | H10-101357 | A | 4/1998 | |
| JP | 2001-192233 | A | 7/2001 | |
| JP | 2005-521093 | A | 7/2005 | |
| JP | 2006-058912 | A | 3/2006 | |
| JP | 2006-133314 | A | 5/2006 | |
| JP | 2007-079563 | A | 3/2007 | |
| JP | 5124701 | B1 | 1/2013 | |
| JP | 2014-179404 | A | 9/2014 | |
| WO | WO-02071554 | A2 * | 9/2002 | ......... G02B 6/03622 |
| WO | 2005/022218 | A1 | 3/2005 | |
| WO | 2014/061409 | A1 | 4/2014 | |
| WO | 2017/073670 | A1 | 5/2017 | |

OTHER PUBLICATIONS

International Search Report issued in corresponding International Application No. PCT/JP2021/006695 mailed May 18, 2021 (3 pages).

Kokki et al., "Fiber amplifier utilizing an Yb-doped large-mode-area fiber with confined doping and tailored refractive index profile"; nLIGHT Corporation et al; Proc. of SPIE vol. 7580 pp. 758016-1-758016-9 (9 pages).

* cited by examiner

RADIUS OF CORE ($\mu$m)

—— REFRACTIVE INDEX PROFILE
- - - - - INTENSITY PROFILE ra/d

—— ρ01
········ ρ11
- - - ρ21
— — ρ02
······· ρ31
— — ρ12

ACTIVE ELEMENT ADDED-OPTICAL FIBER, PREFORM FOR ACTIVE ELEMENT ADDED-OPTICAL FIBER, RESONATOR, AND FIBER LASER DEVICE

TECHNICAL FIELD

One or more embodiments of the present invention relate to an active element added-optical fiber, a preform for an active element added-optical fiber, a resonator, and a fiber laser device capable of suppressing deterioration of beam quality.

BACKGROUND

A fiber laser device, which is excellent in light condensing property, has high power density, and can obtain light that becomes a small beam spot, is used in various fields such as a laser processing field and a medical field. In such a fiber laser device, output of emitted light is increased. In general, a fiber laser device includes an active element added-optical fiber in which a rare earth element, which is an active element, is added to a core to amplify light. However, when the power density of light in an active element added-optical fiber increases, wavelength conversion of light due to stimulated Raman scattering is likely to occur, and light having an unintended wavelength can be emitted. In this case, the light reflected by a workpiece or the like returns to the fiber laser device and is amplified, and the amplification of the light having the wavelength to be amplified in design becomes unstable, and the output can become unstable.

Examples of a means for suppressing such stimulated Raman scattering include increasing the effective cross-sectional area of the light propagating through the core, and as one of the methods for increasing the effective cross-sectional area, increasing the diameter of the core can be mentioned. Therefore, in order to suppress stimulated Raman scattering in the optical fiber, for example, an optical fiber having a core that enables propagation of light in a few mode is used.

In the fiber laser device, the beam quality of emitted light is excellent from the viewpoint of light condensing property or the like. Therefore, there is a demand for suppressing excitation of light in modes other than the basic mode even when the effective cross-sectional area of light is increased by using an optical fiber having a core that enables propagation of light in the few mode as described above. Note that the beam quality is indicated, for example, by $M^2$ (M square) or the like. Therefore, amplification of light in a higher-order mode is suppressed while using an active element added-optical fiber having a core that enables propagation of light in the few mode as in an active element added-optical fiber described in Patent Literature 1 below.

By the way, in an active element added-optical fiber in which a rare earth element is added to the core, it is known that a phenomenon called photodarkening occurs in which the transmission loss of the core portion of the amplification optical fiber gradually increases as pumping light is incident and propagated and the intensity of the output laser light decreases with time. As one of methods for suppressing this photodarkening, for example, addition of aluminum to the core is performed. For example, Non Patent Literature 1 below discloses a configuration in which ytterbium is added only to a first region located in a center portion of a core and aluminum is added to the entire core including a second region surrounding the first region. In the optical fiber of Non Patent Literature 1 below, the concentration of aluminum is the highest among the elements added to the second region.

[Patent Literature 1] JP 5124701 B1
[Non Patent Literature 1] Proc. of SPIE Vol. 7580 758016-1 Fiber amplifier utilizing an Yb-doped large-mode-area fiber with confined doping and tailored refractive index profile.

However, even when light can be propagated in the few mode as in Patent Literature 1, there is a demand for further suppressing deterioration of beam quality.

For example, when the optical fiber of Non Patent Literature 1 is heated to be fusion-spliced with another optical fiber, the diffusion coefficient of aluminum in glass is large, so that the aluminum existing on an outer side of the core diffuses into a cladding, and the refractive index profile of the glass can change from the refractive index profile before heating. When the refractive index profile of the core and the cladding changes in this way, unnecessary higher-order modes are excited in the fusion-spliced portion, and the beam quality can deteriorate.

Therefore, one of more embodiments of the present invention provide an active element added-optical fiber, a preform for an active element added-optical fiber, a resonator, and a fiber laser device capable of suppressing deterioration of beam quality.

SUMMARY

One of more embodiments of the present invention provide an active element added-optical fiber comprising a core and a cladding that surrounds an outer peripheral surface of the core without a gap and capable of propagating light in a few mode, wherein the core has radius d and includes a first region and a second region, the first region is a region from a central axis of the core to radius ra and to which ytterbium that is an active element pumped by pumping light is added, the second region is a region to the radius d that surrounds the first region without a gap, germanium is added to the second region, and the active element is not added to a region of the second region from radius rc to the radius d, the germanium is not added to a region of the first region from the central axis to radius rb, and among concentrations of dopants added to the second region, a concentration of the germanium is highest.

In the active element added-optical fiber, since ytterbium, which is an active element, is added only to a center side of the core, the light in the basic mode is more likely to be amplified than the light in the higher-order mode. Therefore, deterioration of beam quality can be suppressed as compared with the case where the active element is added to the entire core.

By the way, the diffusion coefficient of germanium in glass is smaller than the diffusion coefficient of aluminum in glass. In the active element added-optical fiber, the concentration of germanium is the highest among dopants added to the second region, which is the region of the outer side of the core. Therefore, when the active element added-optical fiber is heated to be fusion-spliced with, for example, another optical fiber, as compared with the optical fiber of Non Patent Literature 1 in which the main dopant added to the outer side of the core is aluminum, the dopant added to the outer side of the core is difficult to diffuse into the cladding, and as a result, the change in the refractive index profile of the core and the cladding due to heating can be suppressed. Therefore, unnecessary higher-order modes are less likely to be excited in the fusion-spliced portion, and the deterioration of beam quality can be further suppressed.

The active element and the germanium may be added to a first diffusion region from the radius rb to the radius rc, in the first diffusion region, a concentration of the active element may decrease toward outside of the core, and the concentration of the germanium may increase toward the outside of the core, and the concentrations of the active element and the germanium at a first matching point at which the concentrations of the active element and the germanium match at a concentration higher than 0 in the first diffusion region may be 70% or less of an average concentration of the active element in a region from the central axis to radius 0.5ra or less.

When the configuration in which the concentration of the active element in the second region decreases from the first region side to the second region side is taken depending on the manufacturing conditions of the optical fiber, with the configuration, the concentration of germanium in the second region increases from the first region side to the second region side. With such a configuration, since the amount of addition of germanium is large even in the region where the amount of addition of the active element is small, the decrease in the refractive index due to a small amount of addition of the active element is suppressed, and the refractive index profile of the core can be close to a flat shape. Therefore, the fluctuation of the refractive index in the first diffusion region can be reduced. In the first diffusion region, when the concentration of the active element and the concentration of germanium match at the first matching point higher than 0 wt %, as compared with the case where the concentration of the active element and the concentration of germanium match at 0 wt %, the refractive index profile can be close to a flatter shape. Furthermore, the concentrations of the active element and the germanium at the first matching point are 70% or less of the average concentration of the active element in the region from the central axis of the core to radius 0.5ra or less, so that it is possible to suppress that the concentrations of the active element and germanium become higher than necessary and it is possible to suppress that the refractive index profile deviates from the flat shape.

At least one up-dopant other than an active element that increases a refractive index may be added to a region from the central axis of the core to radius rd in the second region, a region from the radius rb to the radius rd may be a second diffusion region to which the up-dopant and the germanium are added, in the second diffusion region, a concentration of the up-dopant may decrease toward outside of the core, and the concentration of the germanium may increase toward the outside of the core, and the concentrations of a total amount of the up-dopant and the germanium at a second matching point at which the concentrations of the total amount of the up-dopant and the germanium match at a concentration higher than 0 in the second diffusion region may be 50% or less of an average concentration of the total amount of the up-dopant in the region from the central axis to radius 0.5ra or less.

When the configuration in which the concentration of the up-dopant in the second region decreases from the first region side to the second region side is taken depending on the manufacturing conditions of the optical fiber, with the above configuration, the concentration of germanium in the second region increases from the first region side to the second region side. With such a configuration, since the amount of addition of germanium is large even in the region where the amount of addition of the up-dopant is small, the decrease in the refractive index due to a small amount of addition of the up-dopant is suppressed, and the refractive index profile of the core can be close to a flat shape. Therefore, the fluctuation of the refractive index in the second diffusion region can be reduced. In the second diffusion region, when the concentration of the total amount of the up-dopant and the concentration of germanium match at the second matching point higher than 0 wt %, as compared with the case where the concentration of the total amount of the up-dopant and the concentration of germanium match at 0 wt %, the refractive index profile can be close to a flatter shape. Furthermore, the concentration of the total amount of the up-dopant at the second matching point is 50% or less of the average concentration of the up-dopant in $0 \leq r \leq 0.5ra$ of the first region, so that it is possible to suppress that the concentrations of the up-dopant and germanium become higher than necessary and it is possible to suppress that the refractive index profile deviates from the flat shape.

In one or more embodiments, when the up-dopant is added to the region from the central axis to the radius rd, only the germanium is added to the region of the second region from the larger of the radius rc and the radius rd to the radius d.

In this case, changes in the refractive index profile due to heating of the core and the cladding of the active element added-optical fiber can be further suppressed.

In one or more embodiments, the slope of the refractive index profile at the radius d of the core is −0.035%/μm or less.

In this case, when the active element added-optical fiber of one or more embodiments of the present invention is connected to another optical fiber having a step index-shaped refractive index profile, an estimated value of the connection loss between the optical fibers can be 0.01 dB or less.

One or more embodiments of the present invention further include a cladding that surrounds the outer peripheral surface of the core without a gap, and that the germanium is not added to the cladding.

By not adding germanium to the cladding in this way, it is possible to suppress the diffusion of the dopant in the cladding to the core as compared with the case where germanium is added to the cladding. Therefore, it is possible to more effectively suppress the change in the refractive index profile. Note that when germanium, the up-dopant, and the down-dopant that reduces the refractive index of the core are not added to the cladding, the change in the refractive index profile can be further suppressed.

In one or more embodiments, the core has a step index-shaped refractive index profile, the V-value of the core is 5 or more and 12 or less, and $0.39d \leq ra \leq 0.78d$.

With such a configuration, it is possible to amplify the LP01 mode light with priority over the higher-order mode, and it is possible to further improve the beam quality. With the above configuration, when the core diameter is increased without reducing the relative refractive index difference in order to suppress the microbend loss, the V-value can be increased and the effective cross-sectional area can be increased, so that stimulated Raman scattering can be suppressed.

In one or more embodiments, the standard deviation of the relative refractive index difference of the region of $1.1ra < r \leq 0.9d$ is 0.004 or less.

The refractive index on the outer peripheral side of the core easily influences the distribution of the power of the light propagating through the core. Therefore, with such a configuration, it is possible to suppress unintentional disturbance of the power of the light. Therefore, a reduction in beam quality can be further suppressed.

In one or more embodiments, $0.1d<ra<d$, and when a distance from the central axis of the core is r, in the region of $0.2d<r\leq0.9d$, at least one local maximum value position at a refractive index higher than an average value of a refractive index in the region of $0\leq r\leq0.9d$ and where the refractive index is locally maximum exists.

One or more embodiments of the present invention provide the following regarding the active element added-optical fiber. That is, by adding the active element to the first region in the above range and adding the active element to the second region in the above range in an amount of less than 0.5 wt %, while LP01 mode light propagating through the core is amplified, the amplification of light in the higher-order mode can be suppressed. On the other hand, in the region of $0.2d<r\leq0.9d$, when at least one local maximum value position where the refractive index is locally maximum at a refractive index higher than the average value of the refractive index in the region of $0\leq r\leq0.9d$ exists, it is possible to suppress the LP01 mode light from being excessively concentrated in the vicinity of the central axis and to increase the effective cross-sectional area of the LP01 mode light. Therefore, occurrence of stimulated Raman scattering can be suppressed. Therefore, with the active element added-optical fiber of the present invention, deterioration of beam quality can be suppressed.

In one or more embodiments, when the local maximum value position exists, at least one local maximum value position exists in the region of $0.338d\leq r\leq0.614d$.

In this case, it is possible to efficiently amplify the LP01 mode light by suppressing the LP01 mode light from being excessively concentrated on the center of the core and suppressing the amount of protrusion of the LP01 mode light from the first region. The local maximum value position existing in such a range makes it possible to effectively widen the effective cross-sectional area of the LP01 mode light in the active element added-optical fiber, suppress the occurrence of stimulated Raman scattering, and suppress the deterioration of beam quality.

When the local maximum value position exists, the radius ra may be $0.595d\leq ra\leq0.716d$.

By setting the first region of the core to such a range, it is possible to amplify the LP01 mode light in the active element added-optical fiber with priority over the higher-order mode light, and the deterioration of beam quality can be suppressed.

In one or more embodiments, when the local maximum value position exists, at least one local maximum value position exists in the region of $0.4d<r\leq ra$.

With such a configuration, it is possible to efficiently amplify the LP01 mode light by suppressing the LP01 mode light from being excessively concentrated on the center of the core 11 and suppressing protrusion of the LP01 mode light from the first region.

In one or more embodiments, when the local maximum value position exists, the average value of the concentration of the active element in the region of $0\leq r\leq0.1d$ is higher than the average value of the concentration of the active element in the region of $0.1d<r\leq ra$.

In this case, the LP01 mode light propagating through the core can be further amplified.

When the average value of the concentration of the active element in the region of $0\leq r\leq0.1d$ is higher than the average value of the concentration of the active element in the region of $0.1d<r\leq ra$, the average value of the refractive index in the region of $0\leq r\leq0.1d$ may be higher than the refractive index in the region of $r=0.2d$.

In this case, the efficiency of amplification of the LP01 mode light can be further increased.

When the local maximum value position exists, the average value of the refractive index in the region of $0.1d\leq r\leq0.8ra$ may be higher than the average value of the refractive index in the region of $1.1ra\leq r\leq0.9d$.

In this case, by increasing the local maximum value of the refractive index in the range of $0.2d<r<0.9d$, the effective cross-sectional area of light propagating through the core can be further increased.

When the local maximum value position exists, the average value of the refractive index in the region of $0.1d\leq r\leq0.8ra$ may be lower than the average value of the refractive index in the region of $1.1ra\leq r\leq0.9d$.

In this case, by increasing the local maximum value of the refractive index in the range of $r<0.1d$, the effective cross-sectional area of light propagating through the core can be reduced.

When the local maximum value position exists, the average value of the refractive index in the region of $0.1d\leq r\leq0.8ra$ may be equivalent to the average value of the refractive index in the region of $1.1ra\leq r\leq0.9d$.

Note that the average value of the refractive index in the region of $0.1d\leq r\leq0.8ra$ being equivalent to the average value of the refractive index in the region of $1.1ra\leq r\leq0.9d$ means that the difference between the average value of the refractive index in the region of $0.1d\leq r\leq0.8ra$ and the average value of the refractive index in the region of $1.1ra\leq r\leq0.9d$ is $-0.0077\%$ or more and $0.0089\%$ or less. In this case, when the effect that the local maximum value of the refractive index in the range of $r<0.1d$ reduces the effective cross-sectional area is equivalent to the effect that the local maximum value of the refractive index in the range of $0.2d<r<0.9d$ increases the effective cross-sectional area, the optical fiber according to one or more embodiments of the present invention and the optical fiber having a rectangular refractive index profile can be connected while suppressing the optical loss.

Alternatively, when the local maximum value position exists, in the active element added-optical fiber, the average value of the relative refractive index difference with respect to the cladding in the region of $0.055d\leq r\leq0.1d$ in the core may be equal to or more than the value of the relative refractive index difference at the local maximum value position, the average value of the relative refractive index difference of the core with respect to the cladding may be larger than $0\%$ and $0.18\%$ or less, and the local maximum value position may be 0.55d or less.

Note that, in the following, a plurality of local maximum value positions may exist. Here, "equal to or more than the value of the relative refractive index difference at the local maximum value position" when a plurality of local maximum value positions exists means equal to or more than the value of the relative refractive index difference at the local maximum value position corresponding to the value of the largest relative refractive index difference among the plurality of local maximum value positions. In the following, a plurality of local maximum value positions may exist. Here, "equal to or less than the value of the relative refractive index difference at the local maximum value position" when a plurality of local maximum value positions exists means equal to or less than the value of the relative refractive index difference at the local maximum value position corresponding to the value of the largest relative refractive index difference among the plurality of local maximum value positions.

By forming the active element added-optical fiber in this manner, for example, the effective cross-sectional area can be increased.

When the local maximum value position exists, the core may have a refractive index profile in which the refractive index gradually decreases from the local maximum value position toward at least an inner side of the core.

In such a refractive index profile, for example, as compared with a rectangular refractive index profile or a refractive index profile in which the refractive index protrudes in a shape in which the local maximum value position and the vicinity thereof are convex upward with respect to the rectangular refractive index profile, the vicinity of the end portion in the refractive index profile in the vicinity of the local maximum value position is more likely to be away from the central axis of the core. As described above, the vicinity of the end portion of the refractive index profile in the vicinity of the local maximum value position is away from the central axis of the core, so that the LP01 mode light can be further suppressed from being excessively concentrated in the vicinity of the central axis of the core, and the effective cross-sectional area of the LP01 mode light can be further increased. Therefore, the occurrence of stimulated Raman scattering can be suppressed, deterioration of beam quality can be suppressed, and light can be amplified.

One of more embodiments of the present invention provide a preform for an active element added-optical fiber comprising a core glass body that becomes a core by drawing, wherein the core glass body has radius d and includes a first region and a second region, the first region is a region from a central axis of the core glass body to radius ra and to which an active element pumped by pumping light is added, the second region is a region to the radius d that surrounds the first region without a gap, germanium is added to the second region, and the active element is not added to a region of the second region from radius rc to the radius d, the germanium is not added to a region of the first region from the central axis to radius rb, and among concentrations of dopants added to the second region, a concentration of the germanium is highest.

In such preform for an active element added-optical fiber, the concentration of germanium is the highest among the dopants added to the second region, which is the region of the outer side of the core glass body. Therefore, when drawing the preform for an active element added-optical fiber, as compared with a preform for an active element added-optical fiber in which the main dopant added to the outer side of the core glass body is aluminum, the element added to the outer side of the core glass body is difficult to diffuse into a cladding glass body. Therefore, the refractive index profile of the core and the cladding after drawing is unlikely to change, and it is easy to manufacture an active element added-optical fiber having a refractive index profile close to a design value. In the active element added-optical fiber manufactured from the preform for an active element added-optical fiber, since the change in the refractive index profile is suppressed as described above, even in the case of fusion splicing with another optical fiber, the change in the refractive index profile due to heating is suppressed and the deterioration of beam quality can be suppressed.

The active element and the germanium may be added to a first diffusion region from the radius rb to the radius rc, in the first diffusion region, the concentration of the active element may decrease toward outside of the core glass body, and the concentration of the germanium may increase toward the outside of the core glass body, and the concentrations of the active element and the germanium at a first matching point at which the concentrations of the active element and the germanium match at a concentration higher than 0 in the first diffusion region may be 70% or less of the average concentration of the active element in the region from the central axis to radius 0.5ra or less.

In this case, since the strain at the interface between the first region and the second region can be suppressed as compared with the case where there is no first diffusion region, it is possible to suppress the cracking of the core glass body.

At least one up-dopant other than an active element that increases a refractive index may be added to a region from the central axis of the core glass body to radius rd in the second region, a region from the radius rb to the radius rd may be a second diffusion region to which the up-dopant and the germanium are added, in the second diffusion region, a concentration of the up-dopant may decrease toward outside of the core glass body, and the concentration of the germanium may increase toward the outside of the core glass body, and the concentrations of a total amount of the up-dopant and the germanium at a second matching point at which the concentrations of the total amount of the up-dopant and the germanium match at a concentration higher than 0 in the second diffusion region may be 50% or less of an average concentration of the total amount of the up-dopant in the region from the central axis to radius 0.5ra or less.

In this case, since the strain at the interface between the first region and the second region can be suppressed as compared with the case where there is no second diffusion region, it is possible to suppress the cracking of the core glass body.

In one or more embodiments, when the up-dopant is added to the region from the central axis to the radius rd, only the germanium is added to the region of the second region from the larger of the radius rc and the radius rd to the radius d.

In this case, it is possible to further suppress changes in the refractive index profile due to heating of the core glass body and the cladding glass body of the preform for an active element added-optical fiber.

One or more embodiments of the present invention may further include a cladding glass body that surrounds the outer peripheral surface of the core glass body without a gap, and that the germanium is not added to the cladding glass body.

By not adding germanium to the cladding glass body in this way, it is possible to suppress the diffusion of the dopant in the cladding glass body to the core glass body as compared with the case where germanium is added to the cladding glass body. Therefore, it is possible to more effectively suppress the change in the refractive index profile. Note that when germanium, the up-dopant, and the down-dopant that reduces the refractive index of the core glass body are not added to the cladding glass body, the change in the refractive index profile can be further suppressed.

A resonator of one or more embodiments of the present invention may include: any of the active element added-optical fibers described above; a first mirror that is optically coupled to the core of the active element added-optical fiber on one side of the active element added-optical fiber and reflects light having at least a part of wavelength of light emitted by the pumped active element; and a second mirror that is optically coupled to the core of the active element added-optical fiber on the other side of the active element added-optical fiber and reflects light having at least a part of wavelength of the light reflected by the first mirror at a reflectance lower than that of the first mirror.

With this resonator, amplification of light in a higher-order mode is suppressed while amplifying the LP01 mode light in light traveling between the first mirror and the second mirror. Therefore, light in which deterioration of beam quality is suppressed can be emitted.

A fiber laser device according to one or more embodiments of the present invention may include any of the active element added-optical fibers described above and a light source that emits light for pumping the active element.

As described above, in this active element added-optical fiber, deterioration of beam quality is suppressed and light can be amplified, and thus, with this fiber laser device, light in which deterioration of beam quality is suppressed can be emitted.

As described above, according to the present invention, there are provided an active element added-optical fiber, a preform for an active element added-optical fiber, a resonator, and a fiber laser device capable of suppressing deterioration of beam quality and amplifying light.

DETAILED DESCRIPTION

Figure 1:
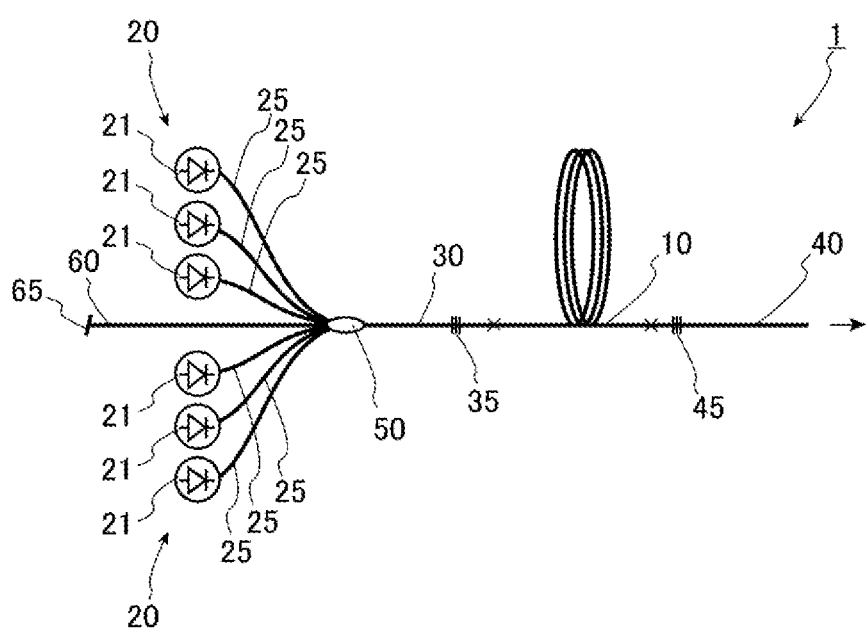
FIG. 1 is a diagram illustrating a fiber laser device according to a first embodiment of the present invention.

One or more embodiments of an optical fiber and a laser device according to the present invention will be described below in detail with reference to the drawings. The embodiments illustrated below are for facilitating the understanding of the present invention, and are not for limiting the interpretation of the present invention. The present invention can be changed or modified without departing from the spirit. Note that, for easy understanding, scales in the drawings can be different from scales described in the description below. Further, in the following, a portion described using a refractive index may be described using a relative refractive index difference, and a portion described using a relative refractive index difference may be described using a refractive index difference.

First Embodiment

FIG. 1 is a diagram illustrating a laser device according to the present embodiment. As illustrated in FIG. 1, a fiber laser device 1 of the present embodiment is a resonator-type fiber laser device, and mainly includes an active element added-optical fiber 10, a pumping light source 20, a first optical fiber 30, a first FBG 35 provided in the first optical fiber 30, a second optical fiber 40, a second FBG 45 provided in the second optical fiber 40, an optical combiner 50, and a third optical fiber 60.

<Configuration of the Active Element Added-Optical Fiber>

Figure 2:
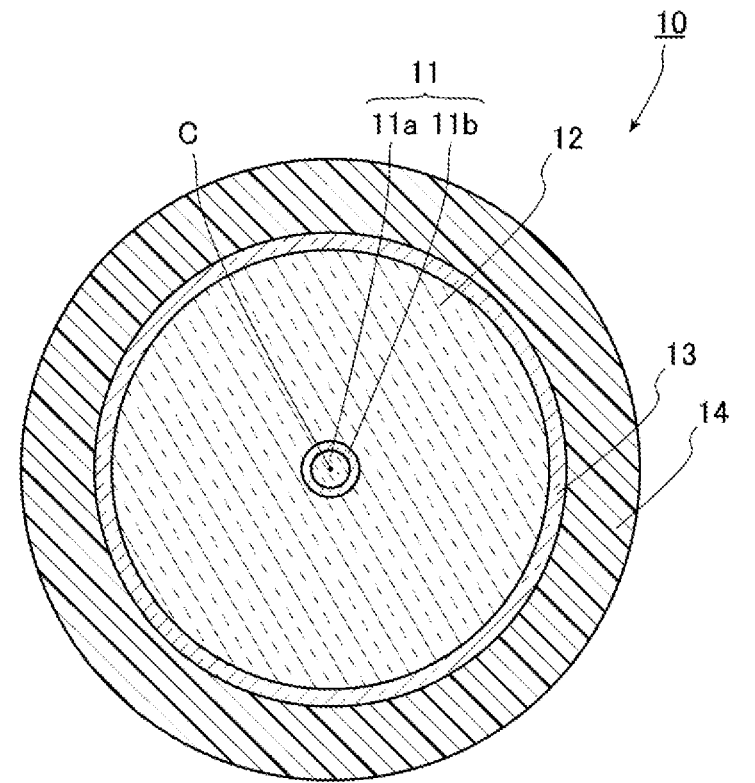
FIG. 2 is a diagram illustrating a state of a cross-section perpendicular to a longitudinal direction of an active element added-optical fiber according to the first embodiment.

FIG. 2 is a cross-sectional diagram illustrating a state of a cross-section of the active element added-optical fiber 10 illustrated in FIG. 1. As illustrated in FIG. 2, the active element added-optical fiber 10 mainly includes a core 11, an inner cladding 12 surrounding the outer peripheral surface of the core 11 without a gap, an outer cladding 13 covering the outer peripheral surface of the inner cladding 12, and a cover layer 14 covering the outer cladding 13. The refractive index of the inner cladding 12 is lower than the refractive index of the core 11, and the refractive index of the outer cladding 13 is lower than the refractive index of the inner cladding 12. That is, the active element added-optical fiber 10 is a so-called double-clad optical fiber.

The core 11 has a first region 11$a$ and a second region 11$b$. Description will be given below assuming that the radius of the core 11 is d and the distance from a central axis C in the radial direction of the core 11 is r. The first region 11$a$ is a region from the central axis C to radius ra. That is, the first region 11$a$ is a region of $0 \leq r \leq ra$. However, the radius ra of the first region 11$a$ is larger than 10% and 75% or less of the radius d of the core 11. That is, $0.1d < ra \leq 0.75d$. Further, the second region 11$b$ is a region that surrounds the first region 11$a$ and is from the outer peripheral surface of the first region 11$a$ to the outer peripheral surface of the core 11. That is, the second region 11$b$ is a region that surrounds the first region 11$a$ without a gap and is of $ra < r \leq d$.

Figure 3:
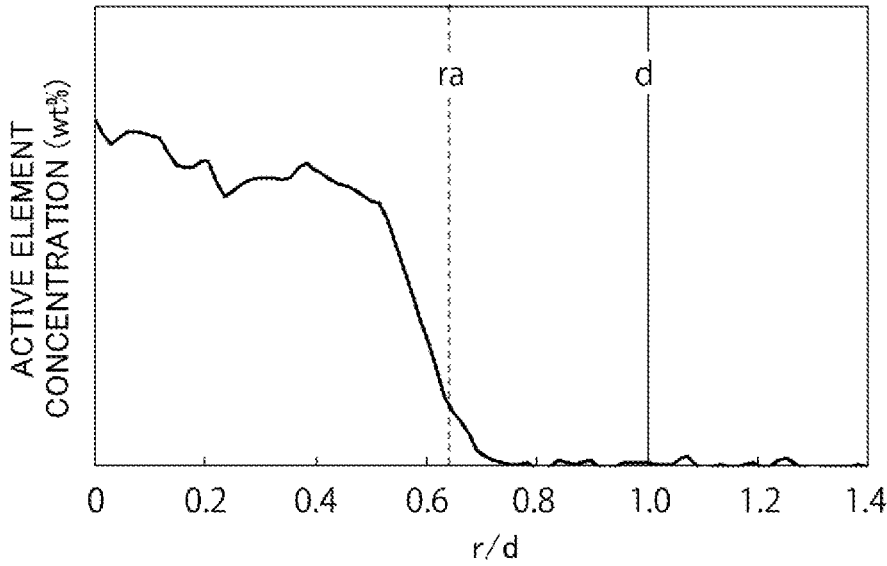
FIG. 3 is a diagram illustrating concentration distribution of an active element added to a core of the active element added-optical fiber according to the first embodiment.

An active element to be pumped by pumping light emitted from the pumping light source 20 is added to the core 11 in part. FIG. 3 is a diagram illustrating concentration distribution of an active element added to the core 11 of the active element added-optical fiber 10. As illustrated in FIG. 3, the first region 11$a$ is made of quartz glass to which the active element is added throughout, and the second region 11$b$ is made of quartz glass to which the active element is added in an amount of less than 0.5 wt %. Such quartz glass includes quartz glass to which an active element is not added. Therefore, when the active element is added in an amount of 0.5 wt % or more to a predetermined region in the radial direction, the first region 11$a$ is the predetermined region and the radius of this predetermined region is ra in the present embodiment.

Note that, even when the active element is added throughout the first region 11$a$ in an amount of 0.5 wt % or more and the active element is detected from the second region 11$b$, the detection amount is lower than 0.5 wt %.

The concentration of the active element in the vicinity of the center of the first region 11$a$ is made higher than the average concentration of the active element in the region to which the active element is added around the vicinity of the center. As illustrated in FIG. 3, the vicinity of the center is a region of 10% of the radius of the core. That is, the average value of the concentration of the active element in the region of $0 \leq r \leq 0.1d$ is higher than the average value of the concentration of the active element in the region of $0.1d < r \leq ra$.

Figure 4:
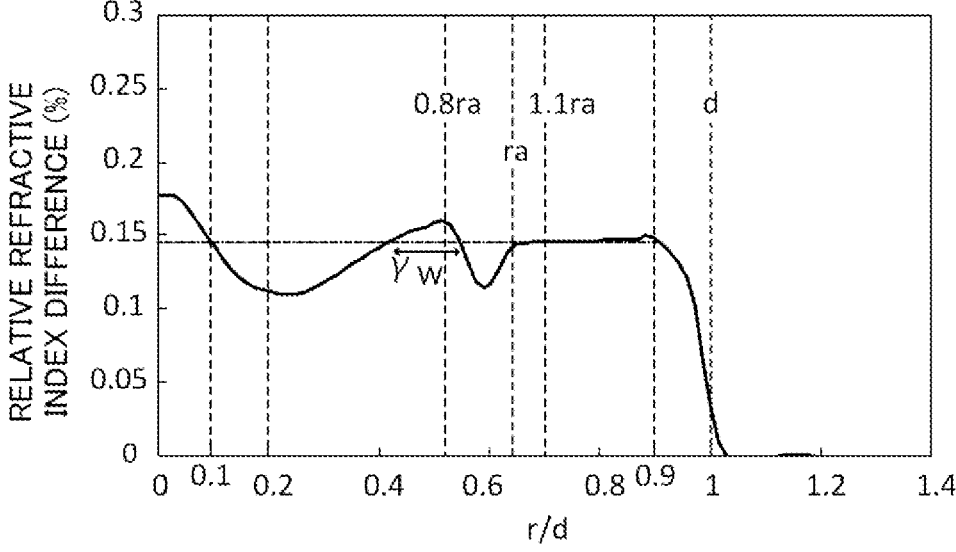
FIG. 4 is a diagram illustrating a state of a refractive index profile of the core of the active element added-optical fiber illustrated in FIG. 3.

In the present embodiment, the active element added to the first region 11$a$ is ytterbium (Yb), and aluminum and phosphorus are further added to the first region 11$a$ in order to enhance resistance to photodarkening. Further, for example, a dopant such as germanium (Ge) that increases the refractive index is added to the second region 11$b$. FIG. 4 is a diagram illustrating a state of the refractive index profile of the core 11 of the active element added-optical fiber 10. With such an additive and its concentration distribution, the first region 11$a$ and the second region 11$b$ have a refractive index profile illustrated in FIG. 4.

Note that in order to adjust the refractive index, a dopant such as fluorine (F) or boron (B) may be added at least in part. Further, although different from the present embodiment, the active element added to the first region 11$a$ may be an active element other than ytterbium. Examples of such active element include thulium (Tm), cerium (Ce), neodymium (Nd), europium (Eu), erbium (Er) and the like in addition to ytterbium as a rare earth element, and further include bismuth (Bi) and the like in addition to a rare earth element as an active element.

As illustrated in FIG. 4, the core 11 is a region from the central axis C to the inner cladding 12 where the relative refractive index difference is 0.05%, and is an inner side of a portion where the relative refractive index difference is 0.05% with respect to the inner cladding 12. In FIG. 4, the position where the relative refractive index difference is 0.05%, that is, the position of the outer peripheral surface of the core 11 is indicated by the broken lines. Note that the reason why the region of the core 11 is defined in this way is that even when the shape of the region having a relative refractive index difference of less than 0.05% is slightly changed, there is little influence on the optical characteristics of the active element added-optical fiber 10. Note that the relative refractive index difference of the core refers to a relative refractive index difference of the core with respect to a region of the cladding adjacent to the core.

In the present embodiment, in the second region 11$b$, the refractive index increases from the boundary with the first region 11$a$ to the vicinity of the inner periphery, the relative refractive index difference is substantially constant in the region from the vicinity of the inner periphery to the vicinity of the outer periphery, and the relative refractive index difference decreases toward the inner cladding 12 in the region in the vicinity of the outer periphery. In the present embodiment, the standard deviation of the relative refractive index difference of the region of $1.1ra < r \leq 0.9d$ is 0.01 or less, and only germanium is added to at least the region of $1.1ra < r \leq d$ in the second region 11$b$ to adjust the refractive index.

In the present embodiment, the average value of the refractive index in the region of $0 \leq r \leq 0.1d$ is higher than the average value of the refractive index in the region of $0.1d < r \leq ra$. Further, the average value of the refractive index in the region of $0 \leq r \leq 0.1d$ is higher than the refractive index in the region of $r = 0.2d$.

Further, in the region of $0.2d < r \leq 0.9d$, at least one local maximum value position where the refractive index is locally maximum at a refractive index higher than the average value of the refractive index in the region of $0 \leq r \leq 0.9d$ exists. More specifically, the local maximum value position refers to the position of the local maximum value of the refractive index in a region where a length $\gamma w$ in the radial direction of the region having a refractive index higher than an average value $\gamma$ of the refractive index in the region of $0 \leq r \leq 0.9d$ is $\frac{1}{10}$ or more of the wavelength of light propagating through the active element added-optical fiber 10. As illustrated in FIG. 4, in the present embodiment, two local maximum value positions exist, and further two positions where the refractive index is minimum exist. Each local maximum value position exists in the first region 11a, and such a local maximum value position does not exist in the second region 11b. One local maximum value position exists on the central axis, and the other local maximum value position exists in the region of $0.4d<r \leq ra$. In the present embodiment, the refractive index profile in the vicinity of the other local maximum value position is a refractive index profile in which the refractive index gradually decreases from the local maximum value position toward at least an inner side of the core. The refractive index profile has a singular point where the monotonous decrease of the refractive index ends from the local maximum value position toward the central axis side of the core 11, and this singular point exists between the central axis of the core 11 and the local maximum value position. Note that this refractive index profile has the other singular point at which the monotonous decrease of the refractive index ends from the local maximum value position toward the cladding side. In the example illustrated in FIG. 4, the other local maximum value position exists at a position where $r=0.5d$ substantially. Further, the refractive index at these local maximum value positions is higher than the refractive index in the region of $1.1ra<r \leq 0.9d$ where the standard deviation is 0.01 or less.

The active element added-optical fiber 10 is a few mode fiber, and in a case where at least light having a wavelength of 1070 nm propagates through the core 11, as the light, at least LP11 mode light can propagate in addition to light in the LP01 mode, which is the basic mode. Therefore, the effective cross-sectional area of light can be increased as compared with a case where the active element added-optical fiber 10 is a single mode fiber. Note that, in the active element added-optical fiber 10 of the present embodiment, even in a case where light having a wavelength of 1030 nm to 1090 nm propagates, at least the LP11 mode light can propagate in addition to the light in the LP01 mode, which is the basic mode.

Here, the radius ra of the first region 11a will be described.

Figure 5:
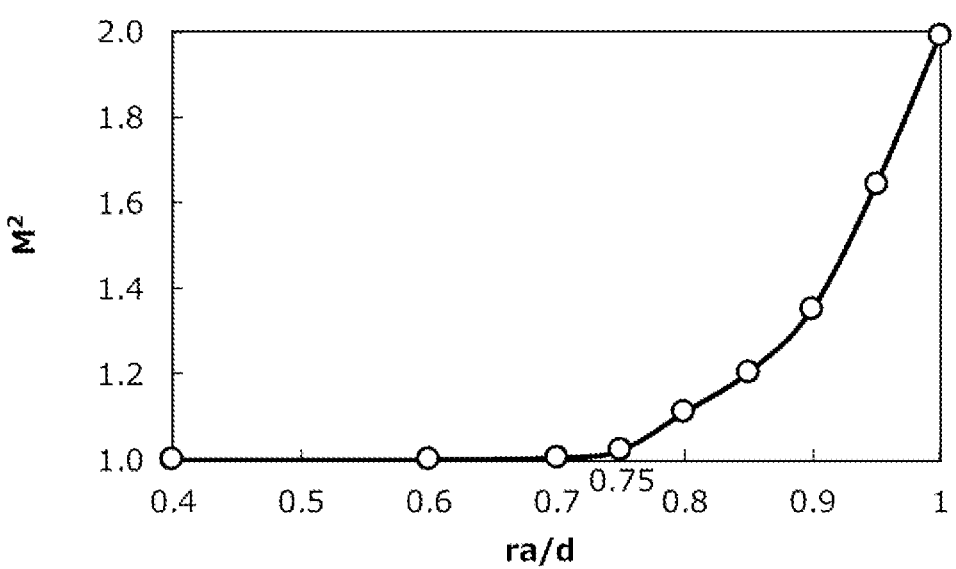
FIG. 5 is a diagram illustrating a relationship between a ratio of a radius of a core to a radius of a first region and beam quality of light emitted from an active element added-optical fiber.

FIG. 5 is a diagram illustrating a relationship between the ratio of the radius d of the core 11 to the radius ra of the first region and beam quality ($M^2$) of light emitted from the active element added-optical fiber 10. More specifically, FIG. 5 is a diagram in which the degree to which the mode of light propagating through the core 11 is amplified when the ratio ra/d of the radius d to the radius ra is changed is estimated by a numerical simulation and converted into beam quality ($M^2$). As illustrated in FIG. 5, it can be seen that when the ratio ra/d of the radius d of the core 11 to the radius ra of the first region 11a to which the active element is added throughout exceeds 0.7, that is, in the case of ra>0.7d, the beam quality starts to deteriorate slightly. In other words, in the case of ra<0.7d, deterioration of beam quality can be suppressed. Further, when ra/d is smaller than 0.7, that is, when ra<0.7d, $M^2$ converges to approximately 1, and it can be seen that deterioration of beam quality is further suppressed. On the other hand, it can be seen that when the ratio ra/d exceeds 0.75, amplification of higher-order modes increases, and the beam quality rapidly deteriorates. That is, as described above, when ra/d is 0.75 or less in the core 11 of the active element added-optical fiber 10, that is, when the radius ra of the first region 11a is $0<ra \leq 0.75d$, amplification of higher-order modes is suppressed in the active element added-optical fiber 10, and deterioration of beam quality of emitted light is suppressed. As described above, when the radius ra of the first region 11a is $0<ra \leq 0.75d$, amplification of higher-order modes is suppressed in the active element added-optical fiber 10, and deterioration of beam quality of emitted light is suppressed. Further, in the case of $0<ra \leq 0.7d$, amplification of higher-order modes is further suppressed in the active element added-optical fiber 10, and deterioration of beam quality of emitted light is further suppressed.

Note that when the radius ra of the first region 11a is larger than 0.1d, the active element added-optical fiber can be easily manufactured using an existing manufacturing method such as an immersion method.

Figure 6:
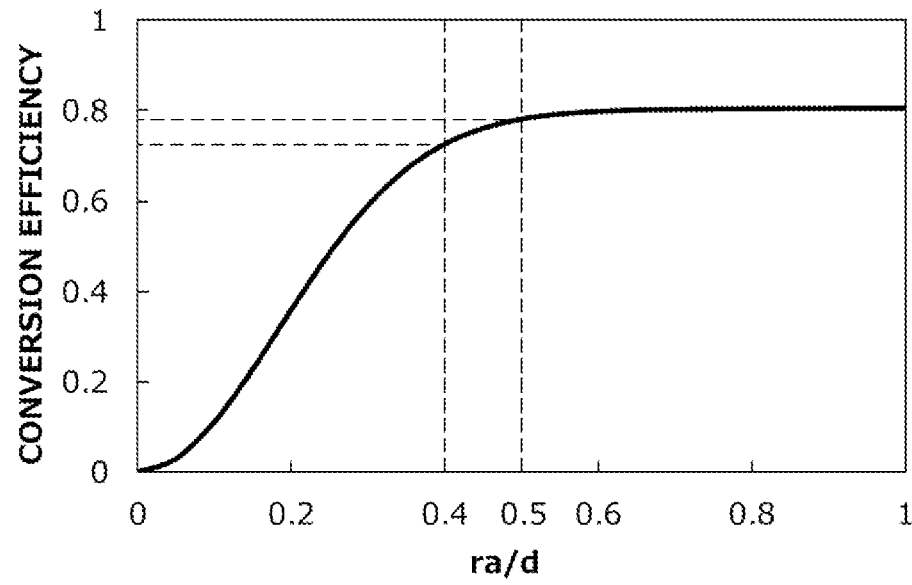
FIG. 6 is a diagram illustrating a relationship between a ratio of a radius of a core to a radius of a first region and conversion efficiency at which pumping light incident on an active element added-optical fiber is converted into light emitted from the active element added-optical fiber.

FIG. 6 is a diagram illustrating a relationship between the ratio of the radius d of the core 11 to the radius ra of the first region 11a and conversion efficiency at which pumping light incident on the active element added-optical fiber 10 is converted into light emitted from the active element added-optical fiber 10. The conversion efficiency is indicated by "power of light emitted from the active element added-optical fiber 10/power of pumping light incident on the active element added-optical fiber 10". As illustrated in FIG. 6, when the ratio (ra/d) of the radius d of the core 11 to the radius ra of the first region 11a is 0.4, the ratio is approximately 90% of the maximum conversion efficiency, and further when ra/d is larger than 0.4, that is, when $0.4d<ra$, the ratio to the maximum value of the conversion efficiency is larger than 90%. Note that, as described above, in a case where ra/d is 0.75 or less, deterioration of beam quality of emitted light is suppressed. That is, when ra/d is 0.75 or less, it is possible to produce a laser with good beam quality while suppressing a reduction in conversion efficiency by setting ra/d to be larger than 0.4. Therefore, in one or more embodiments, the ratio of the radius d of the core 11 and the radius ra of the first region 11a is larger than 0.4 with respect to the conversion efficiency. That is, $0.4d<ra$ is preferable from the viewpoint of increasing the efficiency of amplification of light. Furthermore, when the ratio of the radius d of the core 11 and the radius ra of the first region 11a is 0.5, the ratio is approximately 97% of the maximum conversion efficiency. Therefore, in one or more embodiments, the ratio of the radius d of the core 11 and the radius ra of the first region 11a is larger than 0.5 with respect to the conversion efficiency. That is, $0.5d<ra$ is preferable from the viewpoint of further increasing the efficiency of amplification of light. Further, in the case of $0.5d<ra$, the basic mode can be efficiently amplified while the amplification of higher-order modes is suppressed.

<Configuration Other than the Active Element Added-Optical Fiber>

The first optical fiber 30 is a double-clad optical fiber in which the configuration of the core is different from the configuration of the core 11 of the active element added-optical fiber 10. The first optical fiber 30 is connected to one end of the active element added-optical fiber 10. Therefore, the core 11 of the active element added-optical fiber 10 and the core of the first optical fiber 30 are optically coupled, and the inner cladding 12 of the active element added-optical fiber 10 and the inner cladding of the first optical fiber 30 are optically coupled.

The core of the first optical fiber 30 is mainly different from the core 11 of the active element added-optical fiber 10 in that the active element is not added. The first optical fiber 30 is a few mode fiber, and propagates light that is similar to the light propagating through the core 11 of the active element added-optical fiber 10. Therefore, each LP mode light propagating through the core 11 of the active element added-optical fiber 10 can propagate through the core of the first optical fiber 30 as it is. Note that the definition of the core of the first optical fiber 30 is similar to the definition of the core 11 of the active element added-optical fiber 10.

As described above, the first FBG 35 is provided in the first optical fiber 30. In this way, the first FBG 35 is disposed on one side of the active element added-optical fiber 10 and optically coupled to the core 11 of the active element added-optical fiber 10. In the first FBG 35, a high refractive index portion having a refractive index higher than that of a portion other than the first FBG 35 in the core and a low refractive index portion having a refractive index similar to that of a portion other than the first FBG 35 in the core are periodically repeated along the longitudinal direction of the core. The repeating pattern of the high refractive index portion is formed, for example, by irradiating a site to be the high refractive index portion with ultraviolet rays. The first FBG 35 formed in this manner is configured as a first mirror that reflects light including a predetermined wavelength within light emitted when the active element added to the core 11 of the active element added-optical fiber 10 is in a pumped state. For example, when the active element added to the core 11 of the active element added-optical fiber 10 is ytterbium as in the present embodiment, the predetermined wavelength is, for example, 1030 nm to 1090 nm, and 1070 nm. Further, the reflectance of the first FBG 35 is higher than the reflectance of the second FBG 45 to be described below, and light including the predetermined wavelength is reflected, for example, at 99% or more.

The second optical fiber 40, which does not have the outer cladding, is different from the first optical fiber 30, and the other configuration of the second optical fiber 40 is similar to the configuration of the first optical fiber 30 other than the outer cladding. Therefore, the second optical fiber 40 has a configuration in which the cladding surrounds the core and the cladding is covered with the cover layer. The second optical fiber 40 is connected to the other end of the active element added-optical fiber 10. Therefore, the core 11 of the active element added-optical fiber 10 and the core of the second optical fiber 40 are optically coupled, and the inner cladding 12 of the active element added-optical fiber 10 and the cladding of the second optical fiber 40 are optically coupled. Therefore, the few mode light propagating through the core 11 of the active element added-optical fiber 10 propagates through the core of the second optical fiber 40 in the few mode. Note that, in the case of the configuration of the fiber laser device 1 illustrated in FIG. 1, the inner cladding 12 of the active element added-optical fiber 10 and the cladding of the second optical fiber 40 may not be optically coupled.

The second FBG 45 is provided in the core of the second optical fiber 40 as described above. In this way, the second FBG 45 is disposed on the other side of the active element added-optical fiber 10 and optically coupled to the core 11 of the active element added-optical fiber 10. Similar to the first FBG 35, the second FBG 45 is formed by a periodical repetition of a high refractive index portion and a low refractive index portion. The second FBG 45 is configured as a second mirror that reflects light including a predetermined wavelength reflected by the first FBG 35 at a lower reflectance than the first FBG 35. When light reflected by the first FBG 35 is incident, the second FBG 45 reflects the light at a reflectance of, for example, about 10%. In this way, a resonator is formed by the first FBG 35, the active element added-optical fiber 10, and the second FBG 45. Further, in the present embodiment, nothing is particularly connected to the other end of the second optical fiber 40 on the side opposite to the active element added-optical fiber 10, but a glass rod or the like having a diameter larger than that of the core of the second optical fiber 40 may be connected.

The pumping light source 20 includes a plurality of laser diodes 21. In the present embodiment, the laser diodes 21 are, for example, a Fabry-Perot type semiconductor laser made of a GaAs-based semiconductor, and emits pumping light having a center wavelength of 915 nm. Further, each laser diode 21 of the pumping light source 20 is connected to an optical fiber 25, and the pumping light emitted from the laser diode 21 propagates through the optical fiber 25 as, for example, multimode light.

Each optical fiber 25 is connected to one end of the first optical fiber 30 in the optical combiner 50. Specifically, the cores of the respective optical fibers 25 are connected to the inner cladding of the first optical fiber 30 so that the cores of the respective optical fibers 25 are optically coupled to the inner cladding of the first optical fiber 30. Therefore, the pumping light emitted from each laser diode 21 is incident on the inner cladding of the first optical fiber 30 via the optical fiber 25, and is incident on the inner cladding 12 of the active element added-optical fiber 10 from the inner cladding of the first optical fiber 30.

The third optical fiber 60 is an optical fiber having a core and a cladding. The core of the third optical fiber 60 is connected to the core of the first optical fiber 30 in the optical combiner 50. Therefore, the light propagating through the core of the first optical fiber 30 toward the optical combiner 50 is incident on the core of the third optical fiber 60. Further, on the side of the third optical fiber 60 opposite to the side connected to the first optical fiber 30, a terminal portion 65 that converts light into heat is provided.

Next, the operation of the fiber laser device 1 will be described.

First, pumping light is emitted from each laser diode 21 of the pumping light source 20. This pumping light is incident on the inner cladding 12 of the active element added-optical fiber 10 from the optical fiber 25 via the inner cladding of the first optical fiber 30, and mainly propagates through the inner cladding 12. The pumping light propagating through the inner cladding 12 pumps the active element added to the core 11 when passing through the core 11. The active element in the pumped state emits spontaneous emission light in a wavelength band including a predetermined wavelength. With this spontaneous emission light as a starting point, light including the predetermined wavelength commonly reflected by the first FBG 35 and the second FBG 45 resonates between the first FBG 35 and the second FBG 45. When the resonating light propagates through the core 11 of the active element added-optical fiber 10, the active element in the pumped state causes stimulated emission, and the resonating light is amplified. A part of the resonating light is transmitted through the second FBG 45 and emitted from the second optical fiber 40. Then, when the gain and the loss in the resonator including the first FBG 35, the active element added-optical fiber 10, and the second FBG 45 become equal, a laser oscillation state is formed, and light having a constant power is emitted from the second optical fiber 40.

Note that a major part of the light propagating from the active element added-optical fiber 10 side to the first optical fiber 30 and transmitted through the first FBG 35 is converted into heat at the terminal portion 65 and disappears.

Incidentally, as described above, each of the active element added-optical fiber 10, the first optical fiber 30, and the second optical fiber 40 is a few mode fiber that enables propagation of the LP11 mode light. Therefore, the LP11 mode light can be excited at the connection point between the first optical fiber 30 and the active element added-optical fiber 10, the connection point between the second optical fiber 40 and the active element added-optical fiber 10, and other positions. However, in the active element added-optical fiber 10, the LP01 mode light is amplified, and the amplification of light in a higher-order mode is suppressed. Therefore, the light emitted from the second optical fiber 40 can be light in which amplification of the LP11 mode light is suppressed. Therefore, with the fiber laser device 1 of the present embodiment, light in which deterioration of beam quality is suppressed can be emitted.

As described above, in the active element added-optical fiber 10 of the present embodiment, the radius ra of the first region 11a to which ytterbium, which is an active element, is added throughout is $0.1d<ra<0.75d$, and the active element is added to the second region 11b at a concentration lower than 0.5 wt %. Furthermore, the average value of the concentration of the active element in the region of $0≤r≤0.1d$ is higher than the average value of the concentration of the active element in the region of $0.1d<r≤ra$, and in the region of $0.2d<r≤0.9d$, at least one local maximum value position at a refractive index higher than the average value of the refractive index in the region of $0<r<0.9d$ exists.

By adding the active element to the first region 11a having the above radius and adding the active element to the second region 11b at a concentration lower than 0.5 wt %, while the light in the basic mode propagating through the core 11 is amplified, the amplification of light in a higher-order mode can be suppressed. Further, when the average value of the concentration of the active element in the region of $0≤r≤0.1d$ is higher than the average value of the concentration of the active element in the region of $0.1d<r≤ra$, the LP01 mode light propagating through the core can be further amplified. On the other hand, in the region of $0.2d<r K 0.9d$, when at least one local maximum value position at a refractive index higher than the average value of the refractive index in the region of $0≤r≤0.9d$ exists, it is possible to suppress the LP01 mode light from being excessively concentrated in the vicinity of the central axis and to increase the effective cross-sectional area of the LP01 mode light. Therefore, occurrence of stimulated Raman scattering can be suppressed. Therefore, with the active element added-optical fiber of the present embodiment, deterioration of beam quality can be suppressed and light can be amplified.

As described above, the refractive index profile in the vicinity of the other local maximum value position is a refractive index profile in which the refractive index gradually decreases from the local maximum value position toward at least an inner side of the core. In such a refractive index profile, for example, as compared with a refractive index profile in which the refractive index protrudes in a shape in which the local maximum value position and the vicinity thereof are convex upward with respect to a rectangular refractive index profile, the local maximum value position is likely to be away from the central axis because of an inclination of the refractive index. As described above, the local maximum value position is away from the central axis, so that the LP01 mode light can be further suppressed from being excessively concentrated in the vicinity of the central axis of the core, and the effective cross-sectional area of the LP01 mode light can be further increased. Therefore, the occurrence of stimulated Raman scattering can be suppressed, and deterioration of beam quality can be suppressed.

Therefore, with the resonator including the active element added-optical fiber, and the fiber laser device 1, light in which deterioration of beam quality is suppressed can be emitted.

In the active element added-optical fiber 10 of the present embodiment, the average value of the refractive index in the region of $0≤r≤0.1d$ is higher than the refractive index in the region of $r=0.2d$. Therefore, the efficiency of amplification of the LP01 mode light can be further increased. However, the refractive index in the region of $r=0.2d$ may be equal to or more than the average value of the refractive index in the region of $0≤r≤0.1d$.

In the active element added-optical fiber 10 of the present embodiment, at least one local maximum value position exists in the region of $0.4d<r≤ra$. Therefore, it is possible to efficiently amplify the LP01 mode light by suppressing the LP01 mode light from being excessively concentrated on the center of the core 11 and suppressing protrusion of the LP01 mode light from the first region 11a. Note that the local maximum value position may not exist in such a range. Further, when the local maximum value position exists in the first region, the LP01 mode light can be unfailingly suppressed from protruding from the first region 11a and the LP01 mode light can be efficiently amplified as compared with the case where the local maximum value position does not exist in the first region.

In the active element added-optical fiber 10 of the present embodiment, the standard deviation of the relative refractive index difference of the region of $1.1ra<r≤0.9d$ is 0.01 or less. In general, the refractive index on the outer peripheral side of the core is likely to influence the distribution of the power of the light propagating through the core. Therefore, with such a configuration, it is possible to suppress unintentional disturbance of the power of the light. Note that the standard deviation of the relative refractive index difference of the region of $1.1ra<r≤0.9d$ may not be 0.01 or less.

In the active element added-optical fiber 10 of the present embodiment, the region of $1.1ra<r≤d$ is made of quartz to which only germanium is added. Therefore, the standard deviation of the relative refractive index difference of the region of $1.1ra<r≤0.9d$ can be easily 0.01 or less. However, as long as the active element in the second region 11b is less than 0.5 wt %, a dopant other than germanium may be added to the region of $1.1ra<r≤d$.

In the above embodiment, the example in which the average value of the concentration of the active element in the region of $0≤r≤0.1d$ is higher than the average value of the concentration of the active element in the region of $0.1d<r≤ra$ has been described, but the average value of the concentration of the active element in the region of $0≤r≤0.1d$ may not be higher than the average value of the concentration of the active element in the region of $0.1d<r≤ra$. Even when the average value of the concentration of the active element in the region of $0≤r≤0.1d$ is not higher than the average value of the concentration of the active element in the region of $0.1d<r≤ra$, it is possible to obtain an active element added-optical fiber capable of suppressing deterioration of beam quality.

The average value of the refractive index in the region of $0.1d≤r≤0.8ra$ may be higher than the average value of the refractive index in the region of $1.1ra≤r≤0.9d$. In this case, by increasing the local maximum value of the refractive index in the range of 0.2d<r<0.9d, the effective cross-sectional area of light propagating through the core can be further increased.

The average value of the refractive index in the region of 0.1d≤r≤0.8ra may be lower than the average value of the refractive index in the region of 1.1ra≤r≤0.9d. In this case, the spread of the electric field distribution of the light propagating through the optical fiber can be suppressed, and the effective cross-sectional area of the light propagating through the core can be reduced. This can be achieved by increasing the local maximum value of the refractive index in the range r<0.1d. Therefore, a difference in propagation constant between the LP01 mode and the LP11 mode can be increased, and deterioration of beam quality can be suppressed.

The average value of the refractive index in the region of 0.1d≤r≤0.8ra may be equivalent to the average value of the refractive index in the region of 1.1ra≤r≤0.9d. In this case, when the effect that the local maximum value of the refractive index in the range of r<0.1d reduces the effective cross-sectional area is equivalent to the effect that the local maximum value of the refractive index in the range of 0.2d<r<0.9d increases the effective cross-sectional area, the optical fiber according to the present invention and the optical fiber having a rectangular refractive index profile can be connected while suppressing the optical loss.

The local maximum value position may be formed by an element other than the active element added to the core. This point will be described below.

Figure 7:
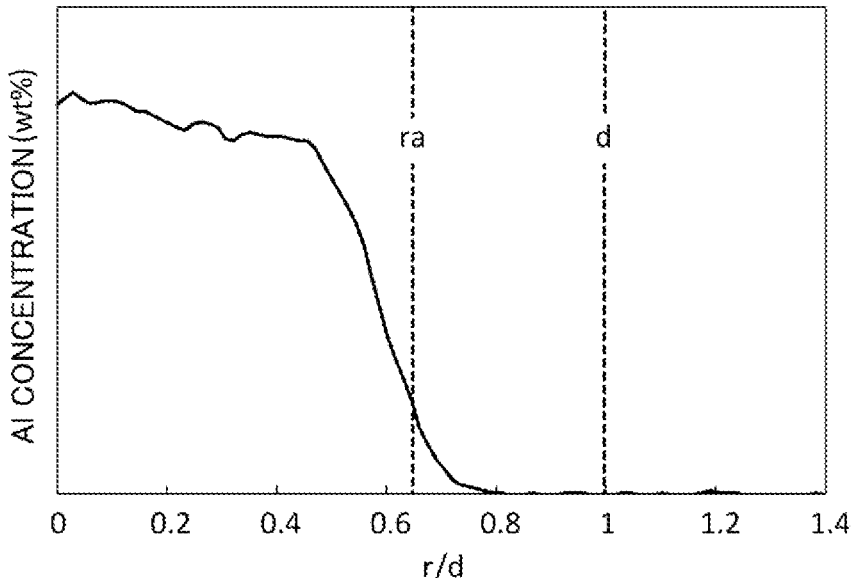
FIG. 7 is a diagram illustrating an example of concentration distribution of aluminum added to the first region of the core.
Figure 8:
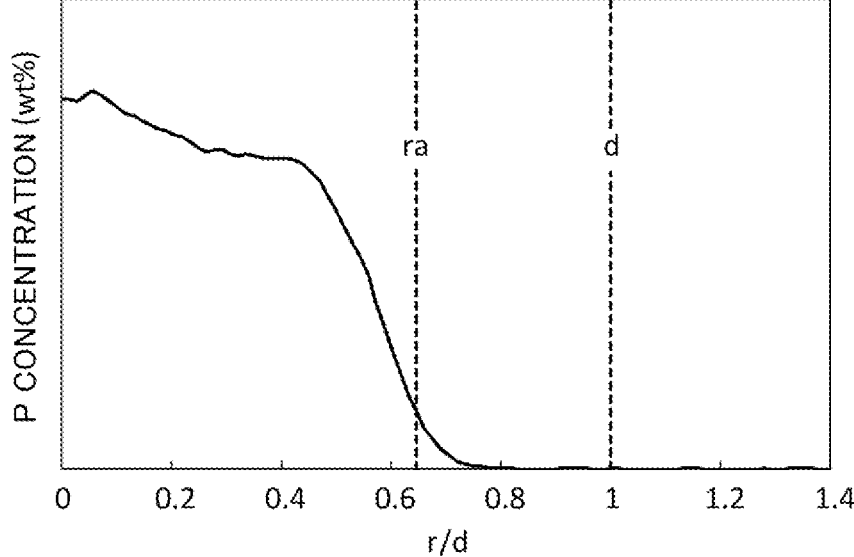
FIG. 8 is a diagram illustrating an example of concentration distribution of phosphorus added to the first region of the core.
Figure 9:
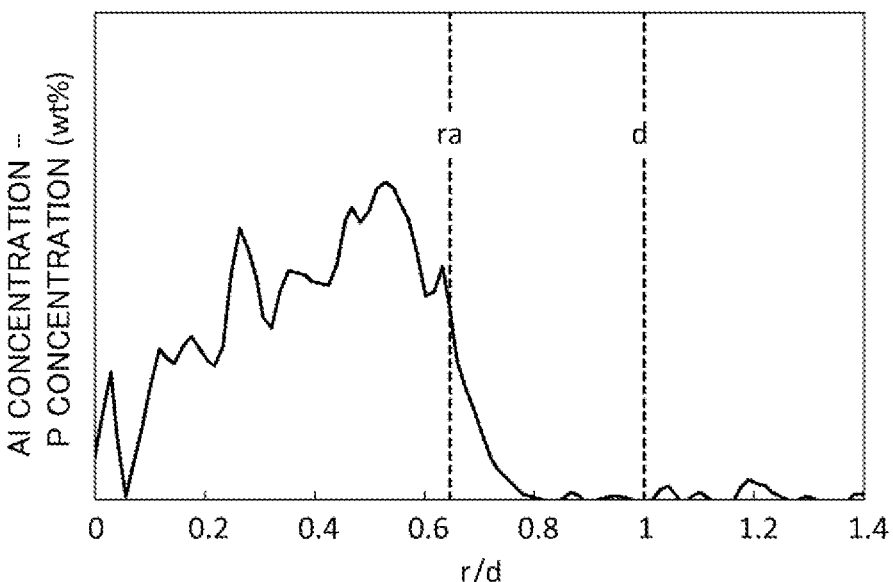
FIG. 9 is a diagram illustrating an example of concentration difference distribution of aluminum and phosphorus added to the first region of the core.
Figure 10:
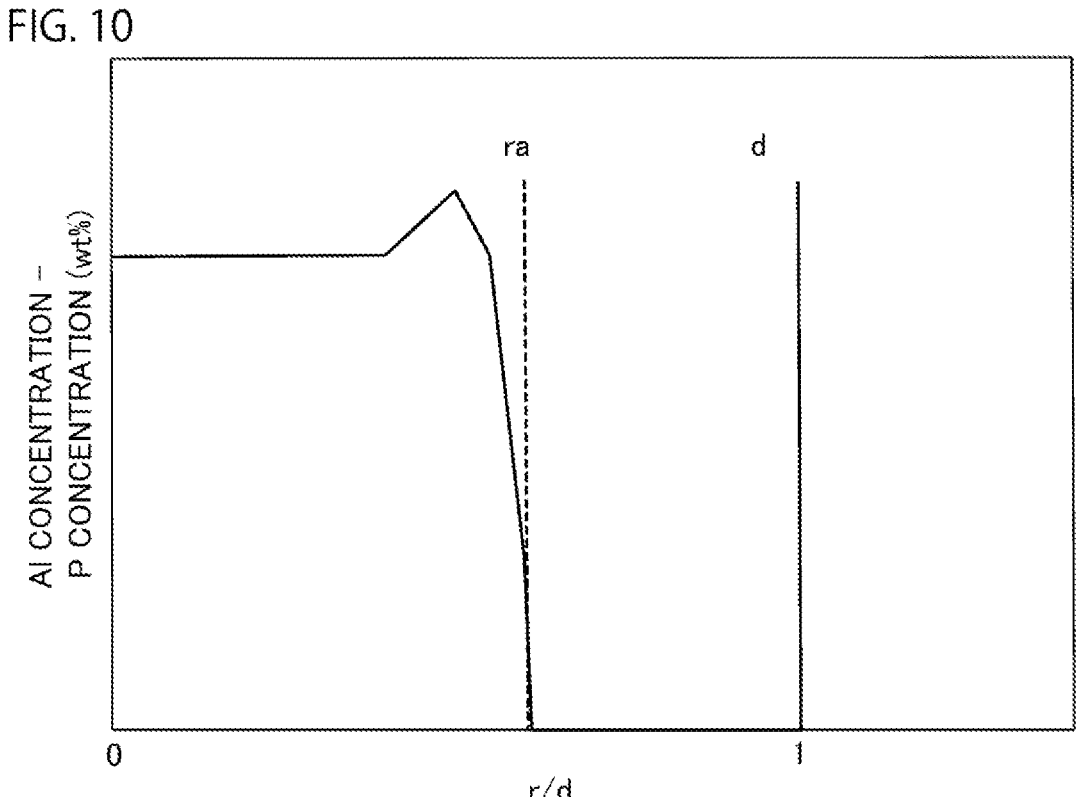
FIG. 10 is a diagram illustrating another example of concentration difference distribution of aluminum and phosphorus added to the first region of the core.

For example, aluminum and phosphorus may be added to at least a part of the first region of the core together with the active element. By adding aluminum or phosphorus to the core together with the active element, it is possible to suppress photodarkening. In the case of co-adding aluminum and phosphorus, when the concentration of aluminum is higher than the concentration of phosphorus, aluminum acts as an up-dopant that increases the refractive index, and phosphorus acts as a down-dopant that reduces the refractive index. On the other hand, when the concentration of phosphorus is higher than the concentration of aluminum, phosphorus acts as an up-dopant, and aluminum acts as a down-dopant. Therefore, by co-adding aluminum and phosphorus at different concentrations, it is possible to suppress photodarkening while suppressing an excessive increase in the refractive index of the core. When the up-dopant and the down-dopant are further added to the first region as described above, for example, aluminum may be added in the concentration distribution illustrated in FIG. 7, and phosphorus may be added in the concentration distribution illustrated in FIG. 8. In this case, the distribution of the concentration difference between aluminum and phosphorus as illustrated in FIG. 9 is formed, and the local maximum value position is formed in the vicinity of 0.5d where the concentration difference is maximum. Also by the distribution of the concentration difference between aluminum and phosphorus as illustrated in FIG. 10, the local maximum value position is formed in the vicinity of 0.5d. Note that, by adjusting the concentration distribution of each of the up-dopant and the down-dopant added to the first region, the local maximum value position can be formed at a position different from the vicinity of 0.5d in the first region.

Figure 11:
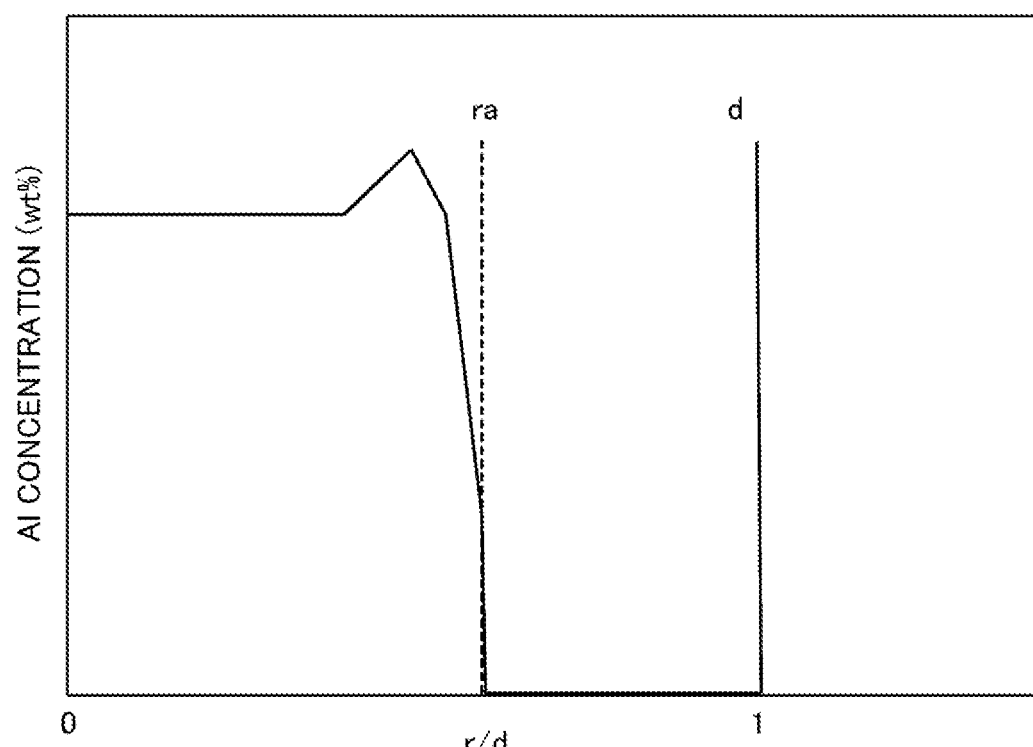
FIG. 11 is a diagram illustrating an example of concentration distribution of aluminum in a case where aluminum is added to the first region of the core and phosphorus is not added.
Figure 12:
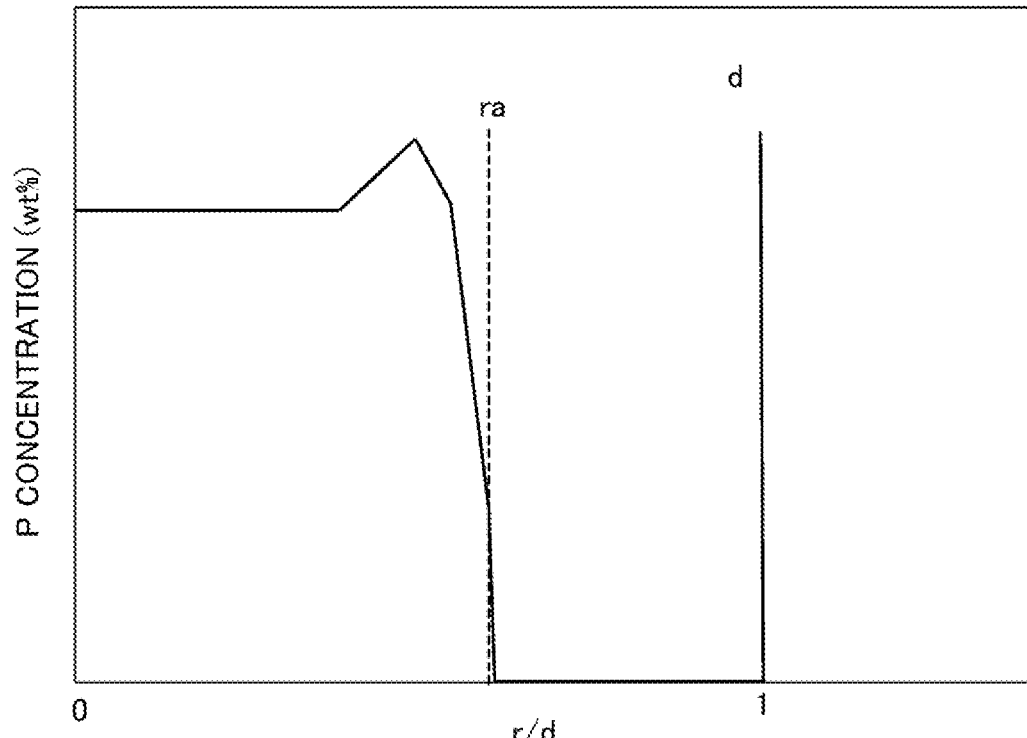
FIG. 12 is a diagram illustrating an example of concentration distribution of phosphorus in a case where phosphorus is added to the first region of the core and aluminum is not added.

An up-dopant may be added to the first region of the core together with the active element. For example, aluminum may be further added as an up-dopant to at least a part of the first region. For example, in the example illustrated in FIG. 11, aluminum is added so that the concentration of aluminum is maximized at the local maximum value position in the vicinity of 0.5d illustrated in FIG. 9. When aluminum, which is an up-dopant, is added in such a concentration distribution, the refractive index is further increased in the vicinity of 0.5d, and it becomes easy to form the local maximum value position in the vicinity of 0.5d. Further, in the example illustrated in FIG. 12, phosphorus is added so that the concentration of phosphorus is maximized at the local maximum value position in the vicinity of 0.5d illustrated in FIG. 9. When phosphorus, which is an up-dopant, is added in such a concentration distribution, the refractive index is further increased in the vicinity of 0.5d, and it becomes easy to form the local maximum value position in the vicinity of 0.5d. Note that, by adjusting the concentration distribution of the up-dopant added to the first region, the local maximum value position can be formed at a position different from the vicinity of 0.5d in the first region.

Figure 13:
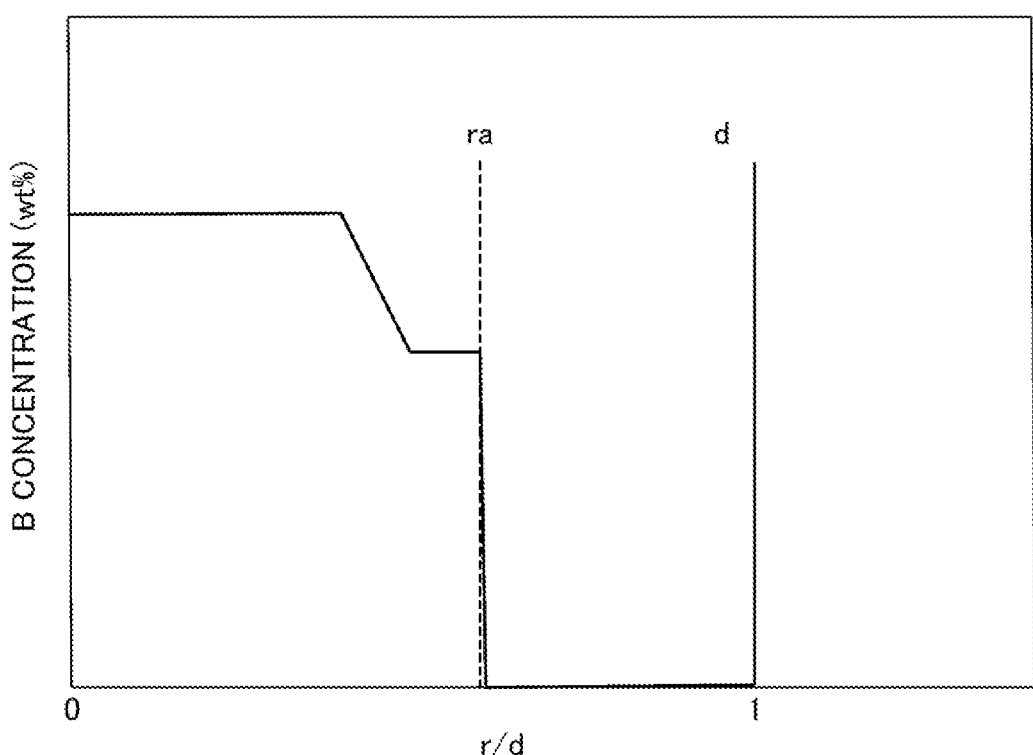
FIG. 13 is a diagram illustrating an example of concentration distribution in a case where boron is added to the first region of the core.

A down-dopant may be added to at least a part of the first region of the core together with the active element. For example, in the example illustrated in FIG. 13, boron is added so that the concentration of boron is minimized at the local maximum value position in the vicinity of 0.5d illustrated in FIG. 9. When boron, which is a down-dopant, is added in such a concentration distribution, a reduction in refractive index in the vicinity of 0.5d is suppressed, and it becomes easy to form the local maximum value position in the vicinity of 0.5d. Note that, by adjusting the concentration distribution of the down-dopant added to the first region, the local maximum value position can be formed at a position different from the vicinity of 0.5d in the first region.

Note that the up-dopant is not limited to the above, but may be, for example, germanium. Further, the down-dopant is not limited to the above, but may be, for example, fluorine.

Second Embodiment

Figure 14:
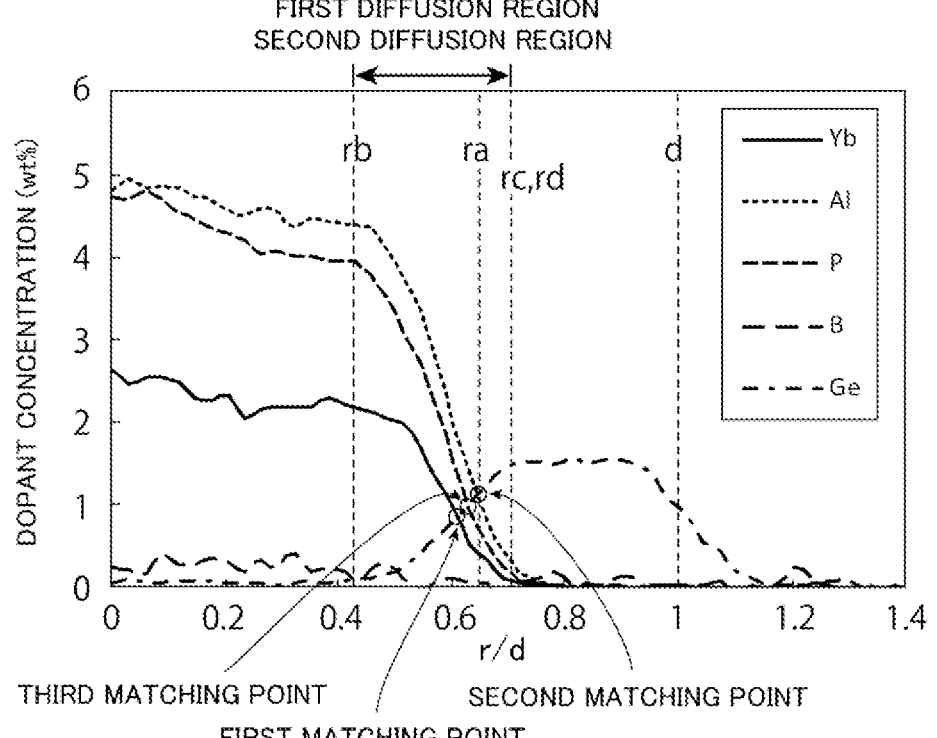
FIG. 14 is a diagram illustrating concentration distribution of dopants added to a core of an active element added-optical fiber according to a second embodiment of the present invention.
Figure 15:
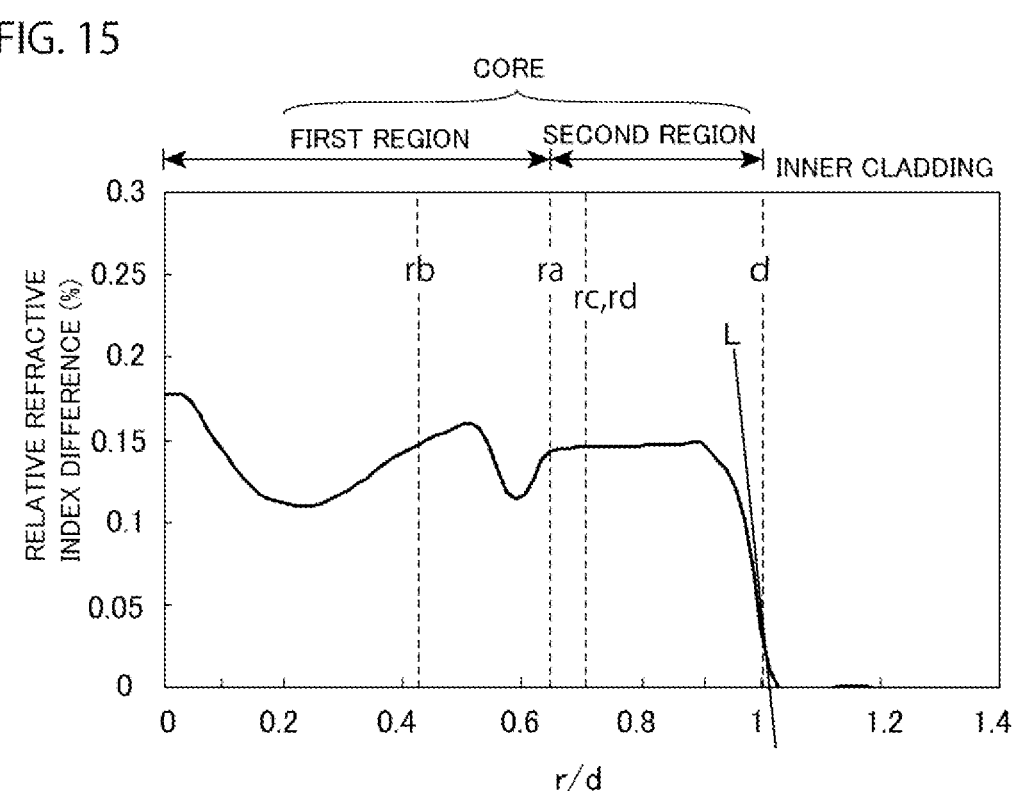
FIG. 15 is a diagram illustrating a state of a refractive index profile of the core of the active element added-optical fiber according to the second embodiment.

Next, the second embodiment will be described. FIG. 14 is a diagram illustrating concentration distribution of dopants added to a core of an active element added-optical fiber according to the second embodiment. FIG. 15 is a diagram illustrating a state of a refractive index profile of the core of the active element added-optical fiber according to the second embodiment. Note that the same or equivalent components as those of the first embodiment are designated by the same reference numerals and duplicated description will be omitted unless otherwise specified.

An active element added-optical fiber 10 of the present embodiment has the configuration illustrated in FIG. 2, similarly to the active element added-optical fiber 10 of the first embodiment, and a core 11 includes a first region 11a, which is a region from a central axis C of the core 11 to radius ra, and a second region 11b, which is a region to radius d that surrounds the first region 11a without a gap. However, the active element added-optical fiber 10 of the present embodiment differs from the active element added-optical fiber of the first embodiment in terms of a dopant added to the core.

As illustrated in FIG. 14, to the core 11 of the present embodiment, ytterbium (Yb), aluminum (Al), phosphorus (P), boron (B), and germanium (Ge), which are active elements, are added. In the present embodiment, the concentration of aluminum is higher than the concentration of phosphorus. Therefore, aluminum acts as an up-dopant, and phosphorus and boron act as down-dopants. Note that the position of the radius ra in the present embodiment is a position where the concentration of ytterbium is 0.5 wt %, which is a position of approximately 0.65d.

Ytterbium, which is an active element, is added over the first region 11a and the region of the second region 11b from the radius ra to radius rc, and is not added to the region of the second region 11b from the radius rc to the radius d. Note that, in the present embodiment, "not added" means that the concentration of each dopant is 0.1 wt % or less. The concentration of ytterbium is approximately 2.5 wt % in the region from the central axis C of the core 11 to radius rb in the first region 11a, but decreases from the radius rb toward the radius rc. As described above, ytterbium has a concentration distribution in which ytterbium diffuses outward in the region from the radius rb to the radius rc and is not added to the outside of rc. The region from the radius rb to the radius rc is a first diffusion region in which the active element is diffused outward. Note that the position of the radius rb in the present embodiment is a position of approximately 0.42d, and the position of the radius rc is a position of approximately 0.70d.

Note that the distances of ra, rb, rc, and d from the central axis C in the present embodiment are 0<rb<d and 0<ra≤rc<d.

Aluminum, which is an up-dopant, is added over the first region 11a and the region of the second region 11b from the radius ra to radius rd. On the other hand, the concentration of aluminum in the region of the second region 11b from the radius rd to the radius d is approximately 0.1 wt % or less. The concentration of aluminum is approximately 4.5 wt % in the region from the central axis C of the core 11 to the radius rb, but decreases from the radius rb toward the radius rd. As described above, aluminum has a concentration distribution in which aluminum diffuses outward in the region from the radius rb to the radius rd and is approximately not added to the outside of rd. The region from the radius rb to the radius rd is a second diffusion region in which the up-dopant is diffused outward. Note that phosphorus is also added in a concentration distribution approximately similar to that of aluminum.

Note that, in the present embodiment, the concentration of each dopant is adjusted so that the radius rc and the radius rd have approximately the same value. Therefore, the first diffusion region and the second diffusion region match each other. Therefore, hereinafter, it may be simply referred to as a diffusion region without distinguishing between the first diffusion region and the second diffusion region. However, the concentration may be adjusted so that the radius rc and the radius rd have different values so that the first diffusion region and the second diffusion region do not match.

Boron is added in a trace amount over a region approximately from the central axis C to radius 0.50d, and the maximum value of the concentration is approximately 0.5 wt %. Further, the concentration of boron in the second region 11b is approximately 0.1 wt % or less.

Germanium is added in the concentration distribution described below. The concentration of germanium in the region from the central axis C to the radius rb is 0.1 wt % or less so that germanium is not added. In the region from the radius rb to the radii rc and rd, the concentration of germanium increases toward the outside of the core 11, and in the region from radii rc and rd to approximately radius 0.95d, the concentration is constant at approximately 1.6 wt %. Further, it gradually decreases from the region of approximately radius 0.95d toward the outside, and is approximately 1.0 wt % in the region of the radius d.

Here, as described above, in the diffusion region, the concentration of germanium increases toward the outside of the core, whereas the concentrations of ytterbium, aluminum, and phosphorus decrease toward the outside of the core. Therefore, the diffusion region includes a first matching point where the concentrations of germanium and ytterbium, which is an active element, match at a concentration higher than 0, a second matching point where the concentrations of germanium and the total amount of the up-dopant match at a concentration higher than 0, and a third matching point where the concentrations of germanium and the total amount of the down-dopant match at a concentration higher than 0. In the present embodiment, since the concentration of aluminum is higher than the concentration of phosphorus, the up-dopant is one type: aluminum. Therefore, at the second matching point in the present embodiment, the concentrations of germanium and aluminum match at a concentration higher than 0. Further, as described above, the down-dopant in the present embodiment is phosphorus and boron. However, in the present embodiment, the concentration of boron at and around the third matching point illustrated in FIG. 14 is extremely smaller than the concentration of phosphorus. Therefore, in the present embodiment, the point where the concentration of phosphorus and the concentration of germanium match can be interpreted as the third matching point. In the present embodiment, these first matching point, second matching point, and third matching point are located in the first region 11a, the first matching point is located at approximately 0.61d, the second matching point is located at approximately 0.65d, and the third matching point is located at approximately 0.63d. The concentrations of ytterbium and germanium at the first matching point are 70% or less of the average concentration of ytterbium in the region from the central axis C to radius 0.5ra or less. However, the concentrations of ytterbium and germanium at the first matching point may be, for example, 70.6% or less, 46.1% or less, 45.1% or less, or 40% or less of the average concentration of ytterbium in the region from the central axis C to radius 0.5ra or less. Further, at the first matching point, the concentration of ytterbium is lower than the concentration of the up-dopant. Further, the concentrations of aluminum and germanium at the second matching point are 50% or less of the average concentration of aluminum in the region from the central axis C to radius 0.5ra or less. However, the concentrations of aluminum and germanium at the second matching point may be 34.4% or less of the average concentration of aluminum in the region from the central axis C to radius 0.5ra or less.

By locating the first matching point, the second matching point, and the third matching point in the first region 11a in this way, the concentration of germanium is the highest among the concentrations of the dopants added to the second region 11b. However, in the present embodiment, it is not essential that the first matching point, the second matching point, and the third matching point are located in the first region 11a.

By adding ytterbium, aluminum, phosphorus, boron, and germanium to the core at such a concentration distribution, the refractive index profile of the core becomes the refractive index profile illustrated in FIG. 15. The refractive index profile of the core 11 illustrated in FIG. 15 has a local maximum value position in the vicinity of approximately radius 0.8ra in the first region 11a, similarly to the refractive index profile of the core 11 of the first embodiment. However, in the present embodiment, it is not essential that the refractive index profile of the core has a local maximum value position. Note that, in FIG. 15, the vertical axis is represented by relative refractive index difference, but the vertical axis may be represented by refractive index.

As described above, the core 11 of the active element added-optical fiber 10 of the present embodiment has radius d, includes the first region 11*a* and the second region 11*b*, the first region 11*a* is a region from the central axis C of the core 11 to the radius ra and to which the active element is added, the second region 11*b* is a region to the radius d that surrounds the first region 11*a* without a gap, germanium is added to the second region 11*b*, an active element is not added to the region of the second region 11*b* from the radius rc to the radius d, germanium is not added to the region of the first region 11*a* from the central axis C to the radius rb, and the concentration of germanium is the highest among the concentrations of dopants added to the second region 11*b*.

As described above, in the active element added-optical fiber 10 of the present embodiment, the active element is not added in the region of the second region 11*b* from the radius rc to the radius d. As described above, in the active element added-optical fiber 10, the active element is added only to the center side of the core 11. Therefore, the light in the basic mode is more likely to be amplified than the light in the higher-order mode, and the deterioration of beam quality can be suppressed as compared with the case where the active element is added to the entire core 11.

As described above, the active element added-optical fiber 10 of the present embodiment has a local maximum value position in the first region 11*a* similar to the active element added-optical fiber 10 of the first embodiment. Therefore, as in the first embodiment, it is possible to suppress the light in the basic mode from being excessively concentrated in the vicinity of the central axis, and it is possible to further suppress the deterioration of beam quality. However, as described above, it is not essential to have the local maximum value position in the present embodiment.

Figure 16:
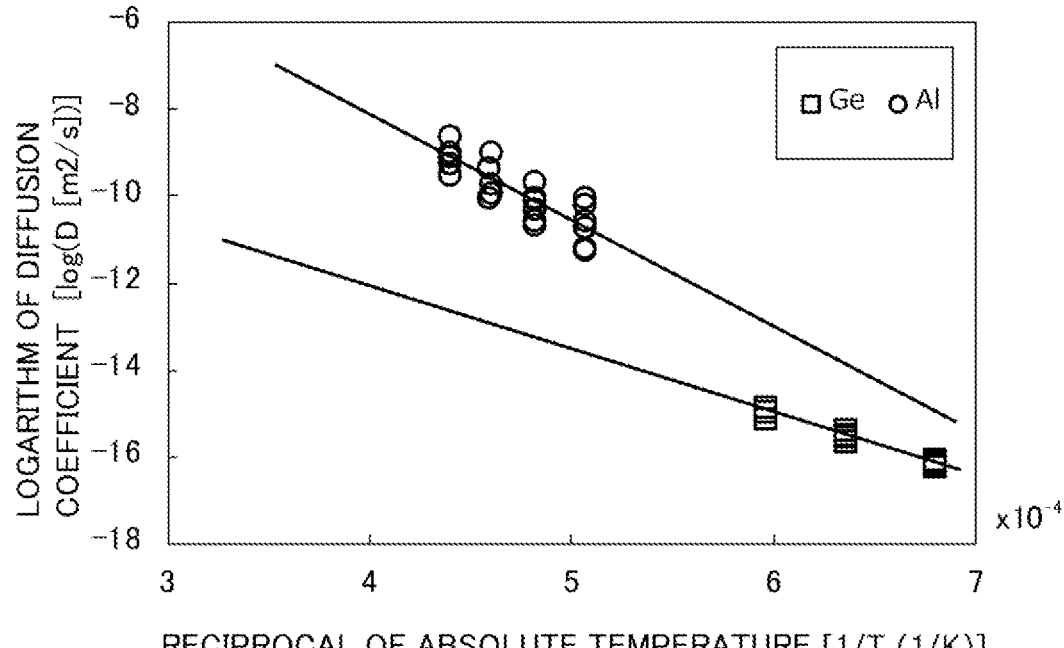
FIG. 16 is a diagram illustrating a relationship between the diffusion coefficient of aluminum and the diffusion coefficient of germanium.

By the way, FIG. 16 is a diagram illustrating a relationship between the diffusion coefficient of germanium in glass and the diffusion coefficient of aluminum in glass. In FIG. 16, the horizontal axis represents the reciprocals of absolute temperature, and the vertical axis represents the logarithms of the diffusion coefficients of germanium and aluminum. As illustrated in FIG. 16, the diffusion coefficient of germanium in glass is larger than the diffusion coefficient of aluminum in glass.

As described above, in the active element added-optical fiber 10 of the present embodiment, the concentration of germanium is the highest among the elements added to the second region 11*b*, which is the region of the outer side of the core 11. Therefore, when the active element added-optical fiber 10 is heated to be fusion-spliced with, for example, another optical fiber, as compared with the optical fiber in which the main dopant added to the outer side of the core is aluminum, the dopant added to the outer side of the core is difficult to diffuse into the cladding. Therefore, the change in the refractive index profile of the core and the cladding due to heating can be suppressed. Therefore, unnecessary higher-order modes are less likely to be excited in the fusion-spliced portion, and the deterioration of beam quality can be suppressed. Further, since germanium that improves the refractive index is not added to the region from the central axis C to the radius rb, the number of added elements is reduced because germanium is not added. Therefore, it is possible to suppress the complication of design of the refractive index profile due to a large number of added elements, and it is possible to realize an active element added-optical fiber having a refractive index profile closer to a design value.

As described above, in the active element added-optical fiber 10 of the present embodiment, the active element and germanium are added to the first diffusion region from the radius rb to the radius rc. In the first diffusion region, the concentration of the active element decreases toward the outside of the core 11, and the concentration of germanium increases toward the outside of the core 11. The concentrations of the active element and germanium at the first matching point where the concentrations of the active element and germanium match at a concentration higher than 0 in the first diffusion region are 70% or less of the average concentration of the active element in the region from the central axis C to radius 0.5ra or less.

When the configuration in which the concentration of the active element in the second region 11*b* decreases from the first region 11*a* side to the second region 11*b* side is taken depending on the manufacturing conditions of the optical fiber, with this configuration, the concentration of germanium in the second region 11*b* increases from the first region 11*a* side to the second region 11*b* side. With such a configuration, since the amount of addition of germanium is large even in the region where the amount of addition of the active element is small, the decrease in the refractive index due to a small amount of addition of the active element is suppressed, and the refractive index profile of the core 11 can be close to a flat shape. Therefore, the fluctuation of the refractive index in the first diffusion region can be reduced. In the first diffusion region, when the concentration of the active element and the concentration of germanium match at the first matching point higher than 0 wt %, as compared with the case where the concentration of the active element and the concentration of germanium match at 0 wt %, the refractive index profile can be close to a flatter shape. Furthermore, the concentrations of the active element and germanium at the first matching point are 70% or less of the average concentration of the active element in the region from the central axis C of the core 11 to radius 0.5ra or less, so that it is possible to suppress that the concentrations of the active element and germanium become higher than necessary and it is possible to suppress that the refractive index profile deviates from the flat shape.

Note that the configuration in which the active element and germanium are added to the first diffusion region from the radius rb to the radius rc, in the first diffusion region, the concentration of the active element decreases toward the outside of the core 11, the concentration of germanium increases toward the outside of the core 11, and the concentrations of the active element and germanium at the first matching point at which the concentrations of the active element and germanium match at a concentration higher than 0 in the first diffusion region are 70% or less of the average concentration of the active element in the region from the central axis C to radius 0.5ra or less is not essential. Even without such a configuration, when the first region 11*a*, which is the region from the central axis C of the core 11 to the radius ra and to which ytterbium, which is an active element pumped by the pumping light, is added and the second region 11*b*, which is a region to the radius d that surrounds the first region 11*a* without a gap, are included, germanium is added to the second region 11*b*, the active element is not added to the region of the second region 11*b* from the radius rc to the radius d, germanium is not added to the region of the first region 11*a* from the central axis C to the radius rb, and the concentration of germanium is the highest among the concentrations of the dopants added to the second region 11*b*, the deterioration of beam quality can be suppressed.

As described above, in the active element added-optical fiber 10 of the present embodiment, at least one up-dopant that increases the refractive index is added to the region from the central axis C of the core 11 to the radius rd. The region from the radius rb to the radius rd is the second diffusion region to which the up-dopant and germanium are added. In the second diffusion region, the concentration of the up-dopant decreases toward the outside of the core 11, and the concentration of germanium increases toward the outside of the core 11. The concentrations of the total amount of the up-dopant and germanium at the second matching point where the concentrations of the total amount of the up-dopant and germanium match at a concentration higher than 0 in the second diffusion region are 50% or less of the average concentration of the total amount of the up-dopant in the region from the central axis C to radius 0.5ra or less.

When the configuration in which the concentration of the up-dopant in the second region 11b decreases from the first region 11a side to the second region 11b side is taken depending on the manufacturing conditions of the optical fiber, with the above configuration, the concentration of germanium in the second region 11b increases from the first region 11a side to the second region 11b side. With such a configuration, since the amount of addition of germanium is large even in the region where the amount of addition of the up-dopant is small, the decrease in the refractive index due to a small amount of addition of the up-dopant is suppressed, and the refractive index profile of the core 11 can be close to a flat shape. Therefore, the fluctuation of the refractive index in the second diffusion region can be reduced. In the second diffusion region, when the concentration of the total amount of the up-dopant and the concentration of germanium match at the second matching point higher than 0 wt %, as compared with the case where the concentration of the total amount of the up-dopant and the concentration of germanium match at 0 wt %, the refractive index profile can be close to a flatter shape. Furthermore, the concentration of the total amount of the up-dopant at the second matching point is 50% or less of the average concentration of the up-dopant in 0<r<0.5ra of the first region, so that it is possible to suppress that the concentrations of the up-dopant and germanium become higher than necessary and it is possible to suppress that the refractive index profile deviates from the flat shape.

Note that the configuration in which at least one up-dopant that increases the refractive index is added to the region from the central axis C of the core 11 to the radius rd, the region from the radius rb to the radius rd is the second diffusion region to which the up-dopant and germanium are added, in the second diffusion region, the concentration of the up-dopant decreases toward the outside of the core 11, the concentration of germanium increases toward the outside of the core 11, and the concentrations of the total amount of the up-dopant and germanium at the second matching point at which the concentrations of the total amount of the up-dopant and germanium match at a concentration higher than 0 in the second diffusion region are 50% or less of the average concentration of the total amount of the up-dopant in the region from the central axis C to radius 0.5ra or less is not essential. Even without such a configuration, when the first region 11a, which is the region from the central axis C of the core 11 to the radius ra and to which ytterbium, which is an active element pumped by the pumping light, is added and the second region 11b, which is a region to the radius d that surrounds the first region 11a without a gap, are included, germanium is added to the second region 11b, the active element is not added to the region of the second region 11b from the radius rc to the radius d, germanium is not added to the region of the first region 11a from the central axis C to the radius rb, and the concentration of germanium is the highest among the concentrations of the dopants added to the second region 11b, the deterioration of beam quality can be suppressed.

Note that, in the present embodiment, when the up-dopant is added to the region from the central axis C to the radius rd, only germanium may be added to the region of the second region 11b from the larger of the radius rc and the radius rd to the radius d.

In this case, changes in the refractive index profile due to heating of the core and the cladding of the active element added-optical fiber can be further suppressed.

The slope of the refractive index profile at the radius d of the core may be −0.035%/μm or less. This point will be described below.

When the active element added-optical fiber is fusion-spliced and connected to an optical fiber in which the core and cladding have an ideal step index-shaped refractive index profile, the core and cladding of the active element added-optical fiber may also have a step index-shaped refractive index profile. However, in the active element added-optical fiber, the dopant added to the core and the cladding can be diffused by drawing or the like at the time of manufacture, and the slope of the refractive index profile at the boundary between the core and the cladding can occur. Taking the refractive index profile of FIG. 15 as an example, the slope of the refractive index profile at the boundary is the slope of a tangent line L at the radius d of the refractive index profile with respect to the vertical axis of FIG. 15.

Figure 17:
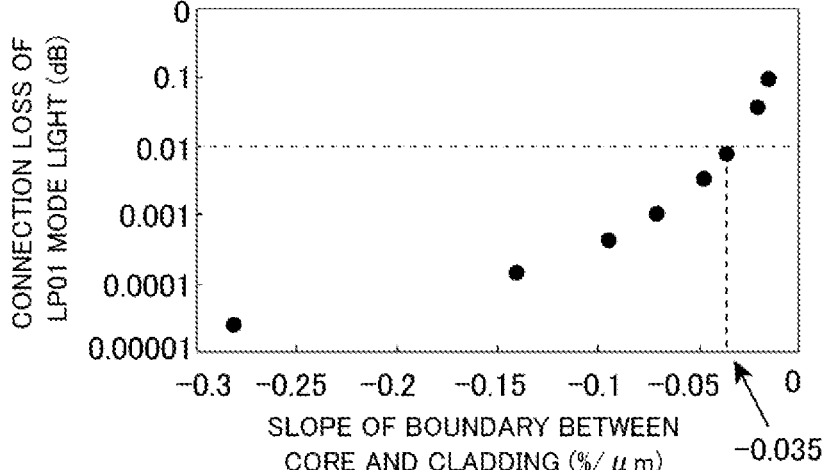
FIG. 17 is a diagram illustrating a relationship between a slope of a refractive index profile at a boundary between a core and a cladding and connection loss of LP01 mode light propagating through the core.

The present inventor has estimated the connection loss of the LP01 mode light in a case where, among optical fibers in which the relative refractive index difference of the core with respect to the cladding is 0.14% and the core radius is 28 um, a reference optical fiber having an ideal step index-shaped refractive index profile and an optical fiber having a refractive index profile having a slope at the boundary between the core and the cladding are fusion-spliced and connected. The results are illustrated in FIG. 17. As illustrated in FIG. 17, it was found that when the slope of the boundary is −0.035%/μm or less, the connection loss of the LP01 mode light is 0.01 dB or less when fusion splicing and connection to the reference optical fiber is performed. ITU-T Recommendation L.12 states that the average connection loss when optical fibers of the same type are fusion-spliced and connected is less than 0.1 dB. The connection loss of light described above is 0.01 dB or less, which is one digit smaller than 0.1 dB described in the above ITU-T Recommendation. Therefore, when the estimated value of the connection loss is 0.01 dB or less, it is possible to sufficiently withstand practical use.

Figure 18:
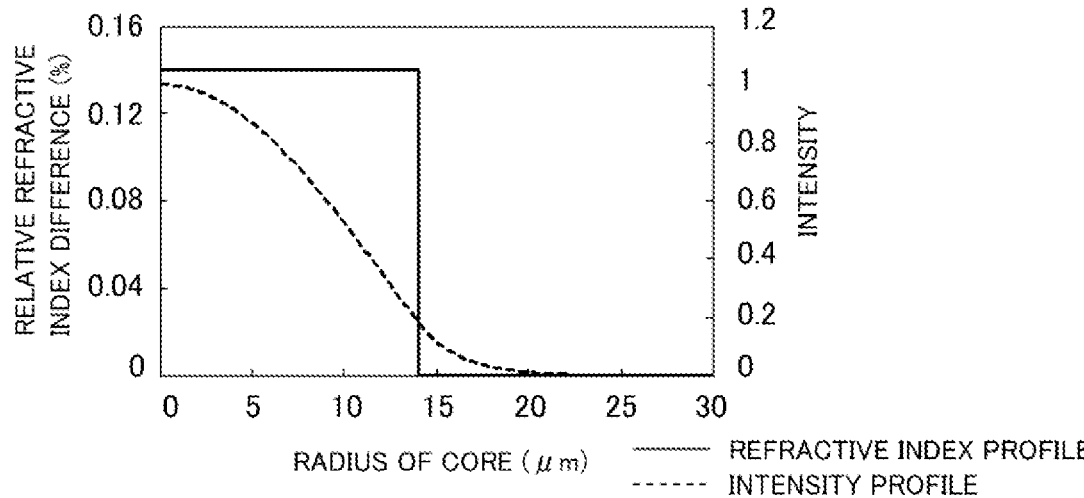
FIG. 18 is a diagram illustrating a step index-shaped refractive index profile and intensity profile of LP01 mode in this case.
Figure 19:
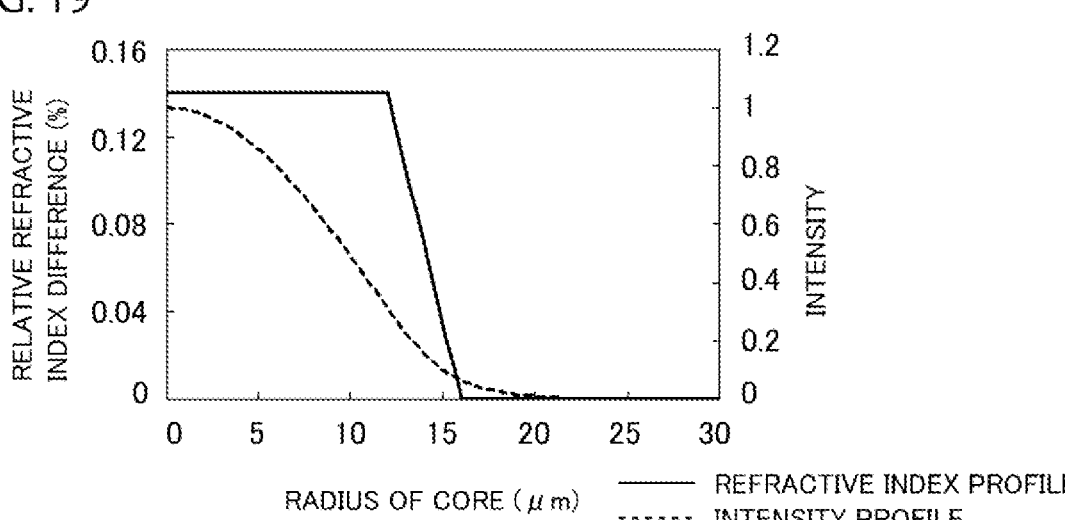
FIG. 19 is a diagram illustrating a refractive index profile in which the boundary between a core and a cladding is tilted and intensity profile in LP01 mode in this case.

FIG. 18 is a diagram illustrating a refractive index profile of the reference optical fiber and intensity profile of LP01 mode in this case. FIG. 19 is a diagram illustrating a refractive index profile in which the slope of boundary between a core and a cladding is −0.035%/μm and intensity profile of LP01 mode in this case. As illustrated in FIGS. 18 and 19, it was found that the intensity profile of the LP01 mode propagating through the core of the optical fiber having a refractive index profile in which the slope of the boundary is −0.035%/μm approximately matches the intensity profile of the LP01 mode light propagating through the core of the optical fiber having an ideal step index-shaped refractive index profile. Therefore, by adjusting the refractive index profile so that the slope of the boundary between the core and the cladding is −0.035%/μm or less, it is possible to effectively suppress the occurrence of connection loss.

In one or more embodiments, germanium is not added to the inner cladding 12.

By not adding germanium to the inner cladding 12 in this way, it is possible to suppress the diffusion of the dopant in the inner cladding 12 to the core as compared with the case where germanium is added to the inner cladding 12. Therefore, it is possible to more effectively suppress the change in the refractive index profile. Note that when germanium, the up-dopant, and the down-dopant are not added to the inner cladding 12, the change in the refractive index profile can be further suppressed.

The core 11 may have a step index-shaped refractive index profile, the V-value of the core 11 is 5 or more and 12 or less, and $0.39d \leq ra \leq 0.78d$. This point will be described below.

Figure 20:
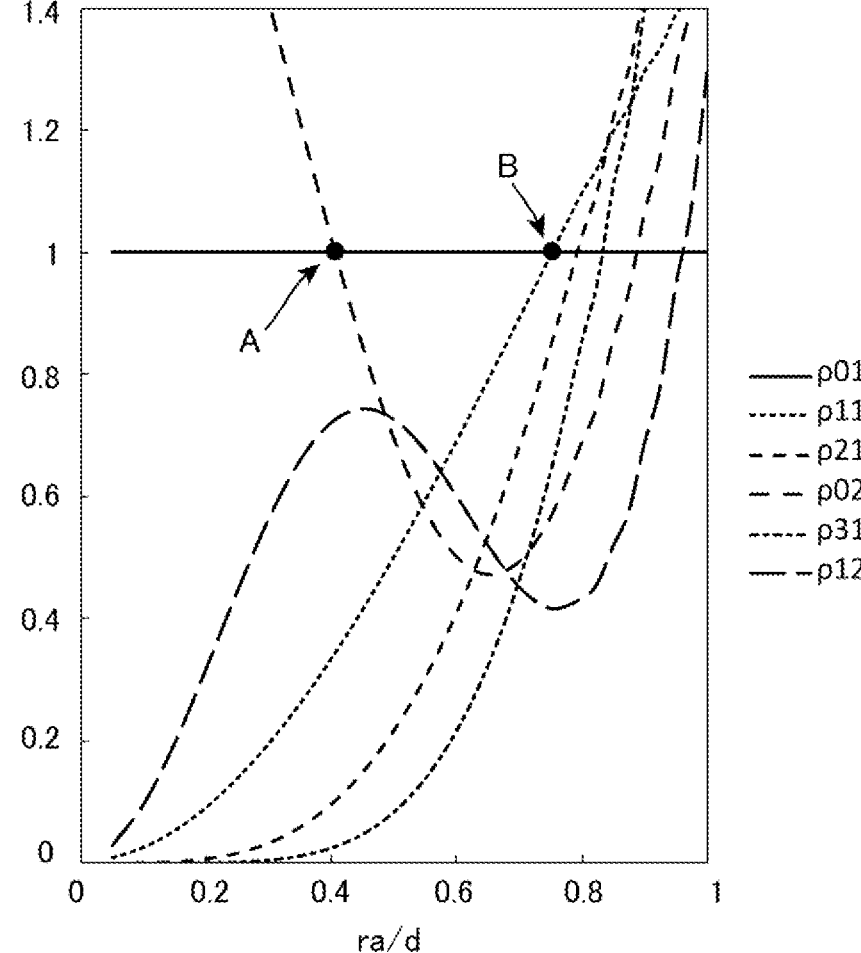
FIG. 20 is a diagram illustrating a relationship between a ratio between a radius of a first region and a radius of a second region when a V-value is 6, and the intensity of light in each mode propagating through the core.
Figure 21:
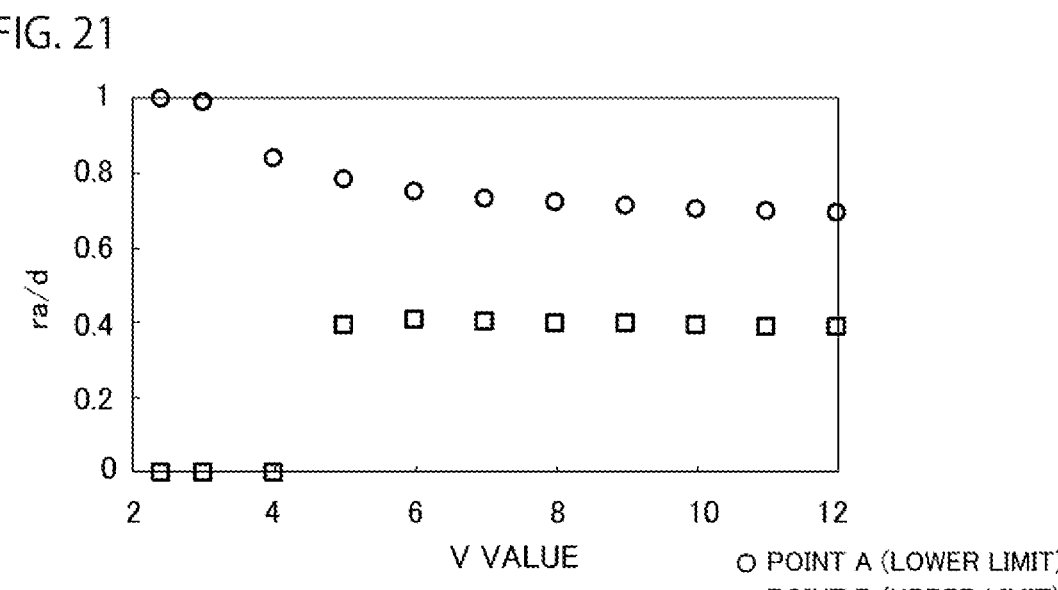
FIG. 21 is a diagram illustrating a suitable range of a ratio between the radius of the first region and the radius of the second region at each-value.

The V-value is a value for determining the number of modes of light that can propagate through the core of the optical fiber, and the larger the value of the V-value, the larger the number of modes of light that can propagate through the core. FIG. 20 illustrates a result of calculating the relationship between the ratio ra/d of the radius ra of the first region to the radius d of the second region and the intensity of each propagation mode propagating through the core when the intensity of the LP01 mode is 1 in an optical fiber having a step index-shaped refractive index profile having a V-value of 6. In FIG. 20, ρ01 indicates LP01 mode light, ρ11 indicates LP11 mode light, ρ21 indicates LP21 mode light, ρ31 indicates LP31 mode light, and ρ12 indicates LP12 mode light. It can be seen from FIG. 20 that, in order to preferentially amplify the basic mode over the higher-order mode, the first region 11a to which a rare earth element is added may range from point A or more and point B or less, which is the range where the intensity of the basic mode is larger than that of the higher-order mode. Next, FIG. 21 illustrates a result of calculating points A and B in an optical fiber having a step index-shaped refractive index profile having a V-value of 2.5 to 12. Note that point A is the lower limit in the range where the intensity of the basic mode is larger than that of the higher-order mode, and point B is the upper limit of the range. It can be seen from FIG. 21 that, when the V-value is 5 or more and 12 or less, the ratio ra/d of point A and the ratio ra/d of point B are almost constant regardless of the V-value, and the value of ra/d may be 0.4 or more and 0.7 or less. Further, Table 1 below shows the ratio ra/d of point A and the ratio ra/d of point B at each V-value belonging to the range of 2.4 or more and 12 or less in FIG. 21.

TABLE 1

| V value | Point A (lower limit) | Point B (upper limit) |
|---|---|---|
| 2.4 | 0 | 1 |
| 3 | 0 | 0.99 |
| 4 | 0 | 0.84 |
| 5 | 0.39 | 0.78 |
| 6 | 0.41 | 0.75 |
| 7 | 0.4 | 0.73 |
| 8 | 0.4 | 0.72 |
| 9 | 0.4 | 0.71 |
| 10 | 0.39 | 0.7 |
| 11 | 0.39 | 0.7 |
| 12 | 0.39 | 0.69 |

The range that ra/d can take for each V-value is also indicated below by the text for the sake of confirmation. That is, when the V-value is 2.4, $0 < ra/d < 1$, when the V-value is 3, $0 < ra/d \leq 0.99$, when the V-value is 4, $0 \leq ra/d \leq 0.84$, when the V-value is 5, $0.39 \leq ra/d \leq 0.78$, when the V-value is 6, $0.41 \leq ra/d \leq 0.75$, when the V-value is 7, $0.4 \leq ra/d \leq 0.73$, when the V-value is 8, $0.4 \leq ra/d \leq 0.72$, when the V-value is 9, $0.4 \leq ra/d \leq 0.71$, when the V-value is 10, $0.39 \leq ra/d \leq 0.7$, when the V-value is 11, $0.39 \leq ra/d \leq 0.7$, and when the V-value is 12, $0.39 \leq ra/d \leq 0.69$ can be obtained. Here, in view of Table 1 above, it can be seen that, when the V-value is 5 or more and 12 or less, the ratio ra/d of point A and the ratio ra/d of point B are almost constant regardless of the V-value, and the value of ra/d may be 0.39 or more and 0.78 or less.

Therefore, when the core 11 has a step index-shaped refractive index profile and the V-value of the core 11 is 5 or more and 12 or less, in the case of $0.39d < ra < 0.78d$, it is possible to amplify the LP01 mode light with priority over the higher-order mode, and the beam quality can be improved. Further, in the above case, when the core diameter is increased without reducing the relative refractive index difference in order to suppress the microbend loss, the V-value can be increased and the effective cross-sectional area can be increased, so that stimulated Raman scattering can be suppressed.

Figure 22:
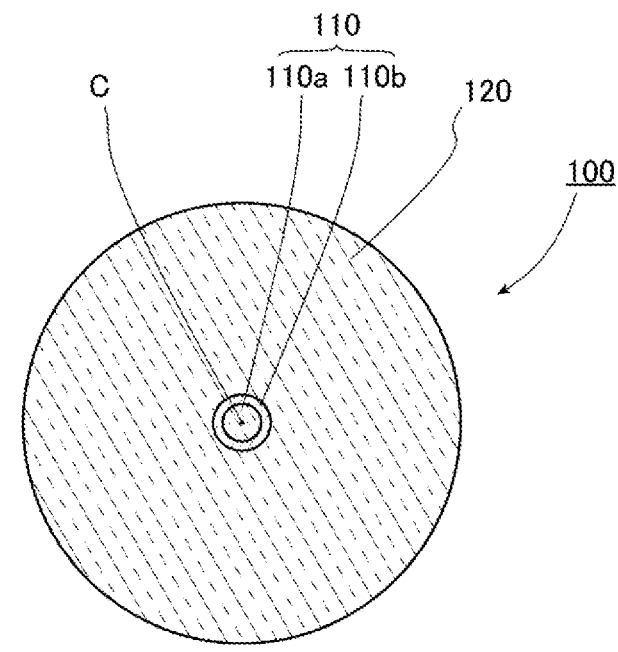
FIG. 22 is a diagram illustrating a preform for an active element added-optical fiber to which the second embodiment is applied from the same viewpoint as in FIG. 2.

Further, the present embodiment can also be applied to a preform for an active element added-optical fiber including a core glass body that becomes a core by drawing and a cladding glass body that becomes a cladding by drawing. FIG. 22 is a diagram illustrating a preform 100 for an active element added-optical fiber to which the present embodiment is applied from the same viewpoint as in FIG. 2. As illustrated in FIG. 22, the preform 100 for an active element added-optical fiber includes a core glass body 110 and a cladding glass body 120. The core glass body 110 has radius d and includes a first region 110a and a second region 110b. The first region 110a is a region from a central axis C of the core glass body 110 to radius ra, and to which ytterbium, which is an active element pumped by pumping light, is added. The second region 110b is a region to the radius d that surrounds the first region 110a without a gap. Germanium is added to the second region 110b, and an active element is not added to the region of the second region 110b from radius rc to the radius d. Further, germanium is not added to the region of the first region 110a from the central axis C to radius rb. Further, the concentration of germanium is the highest among the concentrations of the dopants added to the second region 110b.

With such a configuration, among the dopants added to the second region 110b, which is a region on an outer side of the core glass body 110, the concentration of germanium is the highest. Therefore, when drawing the preform 100 for an active element added-optical fiber, as compared with a preform for an active element added-optical fiber in which the main dopant added to the outer side of the core glass body is aluminum, the element added to the outer side of the core glass body is difficult to diffuse into the cladding glass body. Therefore, the refractive index profile of the core and the cladding after drawing is unlikely to change, and it is easy to manufacture an active element added-optical fiber having a refractive index profile close to a design value. Further, in the active element added-optical fiber manufactured from the preform 100 for an active element added-optical fiber described above, the change in the refractive index profile is suppressed as described above, so that the concentration of germanium on the outer side of the core can be the highest. Therefore, even when the active element added-optical fiber manufactured from the preform 100 for an active element added-optical fiber is fusion-spliced with another optical fiber, the change in the refractive index profile due to heating is suppressed and the deterioration of beam quality can be suppressed. Further, since germanium that improves the refractive index is not added to the region from the central axis C to the radius rb, the number of added elements is reduced because germanium is not added. Therefore, it is possible to suppress the complication of design of the refractive index profile due to a large number of added elements, and it is possible to realize a preform for an active element added-optical fiber having a refractive index profile closer to a design value.

In the preform 100 for an active element added-optical fiber, the active element and germanium are added to the first diffusion region from the radius rb to the radius rc. In the first diffusion region, the concentration of the active element decreases toward the outside of the core glass body, the concentration of germanium increases toward the outside of the core glass body, and the concentrations of the active element and germanium at the first matching point at which the concentrations of the active element and germanium match at a concentration higher than 0 in the first diffusion region are 70% or less of the average concentration of the active element in the region from the central axis C to radius 0.5ra or less. Therefore, the refractive index profile of the core glass body can be close to a flat shape. Further, in this case, since the strain at the interface between the first region and the second region can be suppressed as compared with the case where there is no first diffusion region, it is possible to suppress the cracking of the core glass body. Note that this configuration is not essential as in the case of the active element added-optical fiber.

In the preform 100 for an active element added-optical fiber, at least one up-dopant that increases the refractive index is added to the region from the central axis C of the core glass body 110 to radius rd in the second region 110b. Further, the region from the radius rb to the radius rd is the second diffusion region to which the up-dopant and germanium are added. In the second diffusion region, the concentration of the up-dopant decreases toward the outside of the core glass body, and at the same time, the concentration of germanium increases toward the outside of the core glass body 110. Further, the concentrations of the total amount of the up-dopant and germanium at the second matching point where the concentrations of the total amount of the up-dopant and germanium match at a concentration higher than 0 in the second diffusion region are 50% or less of the average concentration of the total amount of the up-dopant in the region from the central axis C to radius 0.5ra or less. Therefore, the refractive index profile of the core glass body can be close to a flat shape. In this case, since the strain at the interface between the first region and the second region can be suppressed as compared with the case where there is no second diffusion region, it is possible to suppress the cracking of the core glass body. Note that this configuration is not essential as in the case of the active element added-optical fiber.

Note that, from the viewpoint of further suppressing the change in the refractive index profile due to the heating of the glass of the preform for an active element added-optical fiber, only germanium may be added to the region of the second region 110b from the larger of the radius rc and the radius rd to the radius d.

From the viewpoint of suppressing the diffusion of the dopant in the cladding glass body 120 to the core glass body 110, in one or more embodiments, germanium is not added to the cladding glass body 120.

Although the present invention has been described by taking the embodiments as examples, the present invention is not to be construed as being limited to the above embodiments, and the configuration can be appropriately changed within the scope of achieving the object of the present invention.

Figure 23:
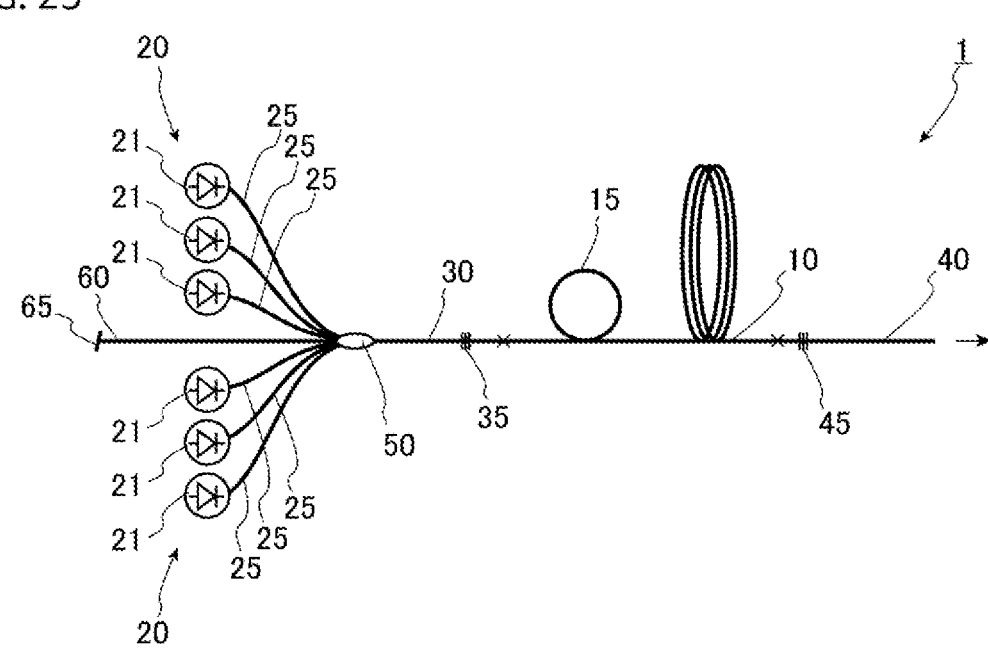
FIG. 23 is a diagram illustrating a variation of a fiber laser device.

For example, the theoretical cutoff wavelength of the LP02 mode light of the active element added-optical fiber 10 of the embodiments described above may be shorter than 1760 nm. By setting the theoretical cutoff wavelength of the LP02 mode light in this manner, for example, in a case where the active element added-optical fiber 10 is bent at a diameter of 120 mm and light of 1070 nm is caused to propagate through the active element added-optical fiber 10, the cutoff wavelength in the LP02 mode can be shorter than 1070 nm at the site of the active element added-optical fiber 10 bent at a diameter of 120 mm, and the LP02 mode light can be leaked while the LP01 mode light is propagated. FIG. 23 is a diagram illustrating a variation of the fiber laser device 1. Specifically, it is a diagram illustrating a fiber laser device having a site of the active element added-optical fiber 10 bent at a diameter of 120 mm as described above. Note that, in the description of FIG. 23, the same configurations as those described in the above embodiments are denoted by the same reference numerals, and redundant description is omitted unless otherwise specified. The fiber laser device 1 of FIG. 23 is different from the fiber laser device of the above embodiments in that the theoretical cutoff wavelength of the LP02 mode light of the active element added-optical fiber 10 is shorter than 1760 nm, and the active element added-optical fiber 10 has a bent portion 15 bent at a diameter of 120 mm. Light having a wavelength of 1760 nm propagates through the bent portion 15, so that the LP02 mode light can be leaked. Therefore, when the active element added-optical fiber 10 has the bent portion 15, it is possible to suppress propagation of the light in a higher-order mode, which is an even mode, while propagating the LP01 mode light.

Figure 24:
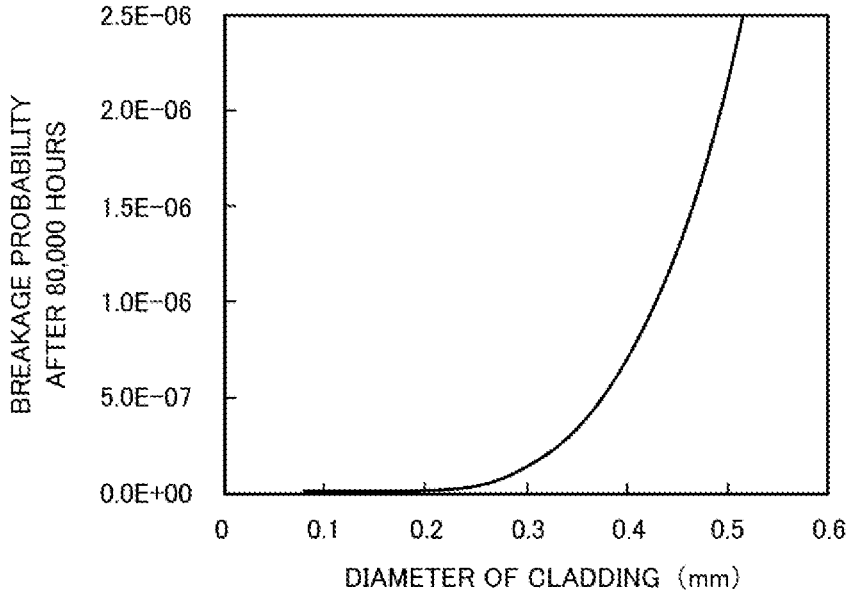
FIG. 24 is a diagram illustrating a relationship between a diameter of a cladding and a breakage probability.

Incidentally, there is a concern that when the active element added-optical fiber 10 is bent at a diameter of 120 mm, the active element added-optical fiber 10 can be broken. Therefore, in this case, the diameter of the cladding made of quartz glass of the active element added-optical fiber 10 may be set to be within a predetermined size. The cladding made of quartz glass is the inner cladding 12 when the outer cladding 13 is made of resin, and is the inner cladding 12 and the outer cladding 13 when the outer cladding 13 is made of quartz glass. FIG. 24 is a diagram illustrating a relationship between a diameter of a cladding and a breakage probability. This breakage probability is the breakage probability of an optical fiber after 80,000 hours in a case where an optical fiber having a cladding made of quartz glass is wound one turn with a diameter of 120 mm and a load that increases the length of the optical fiber by 1% is applied. From FIG. 24, when the diameter of the cladding is 430 μm or less, the breakage probability of the optical fiber after 80,000 hours can be suppressed to 106 or less. Therefore, when the outer cladding 13 is made of resin, the diameter of the inner cladding 12 may be 430 μm or less, and when the outer cladding 13 is made of quartz glass, the diameter of the outer cladding 13 may be 430 μm or less.

In the above embodiments, the resonator-type fiber laser device has been described as an example of the fiber laser device, but the fiber laser device using the active element added-optical fiber 10 of the present invention may be, for example, of a master oscillator-power amplifier (MO-PA) type in which pumping light and seed light are incident on the active element added-optical fiber 10.

In the above embodiments, the region in which the relative refractive index difference is 0.05% from the central axis C to the inner cladding 12 is the core 11, but the region to be the core may not be the region in which the relative refractive index difference is 0.05% as long as it is the region in which the relative refractive index difference from the central axis to the inner cladding of the optical fiber is larger than 0%.

Hereinafter, the active element added-optical fiber having the local maximum value position and the like will be described more specifically with reference to examples and comparative examples, but the present invention is not limited to the examples described below.

Examples 1 to 33

The active element added-optical fiber illustrated in FIG. 2 was prepared as Examples 1 to 33. In these active element position when d=1; G: the radius ra of the first region 11a when d=1; H: the average value (%) of the relative refractive index difference with respect to the inner cladding 12 in the region of $0 \leq r \leq 0.9d$, and I: the standard deviation of the distribution of the relative refractive index difference with respect to the inner cladding 12 in the region of $1.1ra < r \leq 0.9d$. Note that the refractive index profile of the active element added-optical fiber of Example 4 is as illustrated in FIG. 4, and the concentration distribution of ytterbium added to the core of the active element added-optical fiber is as illustrated in FIG. 3. Further, the active element added-optical fibers were an optical fiber in which the theoretical cutoff wavelength in the LP02 mode was shorter than 1760 nm.

TABLE 2

| | A | B | C | D | E | F | G | H | I |
|---|---|---|---|---|---|---|---|---|---|
| Example1 | 2.54 | 2.11 | 0.184 | 0.121 | 0.18 | 0.529 | 0.676 | 0.142 | 0.002 |
| Example2 | 2.48 | 2.01 | 0.165 | 0.107 | 0.17 | 0.514 | 0.643 | 0.138 | 0.004 |
| Example3 | 2.44 | 2.01 | 0.160 | 0.108 | 0.17 | 0.529 | 0.662 | 0.135 | 0.003 |
| Example4 | 2.53 | 1.95 | 0.168 | 0.112 | 0.16 | 0.515 | 0.647 | 0.139 | 0.001 |
| Example5 | 2.56 | 1.94 | 0.155 | 0.112 | 0.15 | 0.515 | 0.632 | 0.137 | 0.002 |
| Example6 | 2.77 | 2.14 | 0.169 | 0.124 | 0.17 | 0.514 | 0.671 | 0.146 | 0.002 |
| Example7 | 2.71 | 2.15 | 0.190 | 0.138 | 0.18 | 0.458 | 0.639 | 0.156 | 0.001 |
| Example8 | 2.56 | 2.06 | 0.150 | 0.115 | 0.15 | 0.485 | 0.647 | 0.131 | 0.001 |
| Example9 | 2.79 | 2.14 | 0.160 | 0.119 | 0.15 | 0.471 | 0.662 | 0.134 | 0.001 |
| Example10 | 2.57 | 2.13 | 0.156 | 0.116 | 0.16 | 0.478 | 0.716 | 0.133 | 0.001 |
| Example11 | 2.64 | 2.07 | 0.164 | 0.120 | 0.15 | 0.471 | 0.632 | 0.134 | 0.001 |
| Example12 | 2.68 | 2.04 | 0.168 | 0.118 | 0.16 | 0.463 | 0.642 | 0.134 | 0.001 |
| Example13 | 2.39 | 2.02 | 0.178 | 0.133 | 0.19 | 0.514 | 0.639 | 0.149 | 0.001 |
| Example14 | 2.36 | 1.98 | 0.149 | 0.106 | 0.14 | 0.529 | 0.662 | 0.123 | 0.001 |
| Example15 | 2.54 | 1.93 | 0.148 | 0.110 | 0.15 | 0.537 | 0.672 | 0.126 | 0.001 |
| Example16 | 2.60 | 2.11 | 0.165 | 0.110 | 0.16 | 0.493 | 0.657 | 0.129 | 0.001 |
| Example17 | 2.05 | 1.70 | 0.182 | 0.117 | 0.14 | 0.500 | 0.632 | 0.131 | 0.001 |
| Example18 | 2.08 | 1.83 | 0.162 | 0.112 | 0.13 | 0.448 | 0.657 | 0.126 | 0.001 |
| Example19 | 2.15 | 1.79 | 0.164 | 0.118 | 0.14 | 0.463 | 0.642 | 0.131 | 0.001 |
| Example20 | 2.15 | 1.81 | 0.151 | 0.111 | 0.14 | 0.463 | 0.627 | 0.126 | 0.001 |
| Example21 | 2.21 | 1.82 | 0.148 | 0.107 | 0.14 | 0.463 | 0.627 | 0.121 | 0.002 |
| Example22 | 2.02 | 1.66 | 0.151 | 0.113 | 0.14 | 0.493 | 0.627 | 0.125 | 0.001 |
| Example23 | 2.06 | 1.73 | 0.152 | 0.112 | 0.15 | 0.530 | 0.652 | 0.129 | 0.001 |
| Example24 | 2.86 | 2.25 | 0.195 | 0.118 | 0.18 | 0.543 | 0.700 | 0.143 | 0.001 |
| Example25 | 2.57 | 2.06 | 0.171 | 0.106 | 0.17 | 0.529 | 0.643 | 0.134 | 0.001 |
| Example26 | 2.43 | 1.96 | 0.176 | 0.117 | 0.18 | 0.521 | 0.662 | 0.137 | 0.000 |
| Example27 | 2.12 | 1.76 | 0.186 | 0.117 | 0.16 | 0.507 | 0.597 | 0.142 | 0.001 |
| Example28 | 2.51 | 2.01 | 0.185 | 0.116 | 0.17 | 0.500 | 0.647 | 0.143 | 0.001 |
| Example29 | 2.37 | 1.86 | 0.171 | 0.116 | 0.18 | 0.507 | 0.627 | 0.143 | 0.001 |
| Example30 | 2.19 | 1.75 | 0.171 | 0.115 | 0.13 | 0.347 | 0.639 | 0.129 | 0.000 |
| Example31 | 2.20 | 1.79 | 0.161 | 0.120 | 0.14 | 0.338 | 0.606 | 0.130 | 0.001 |
| Example32 | 1.31 | 1.10 | 0.135 | 0.091 | 0.13 | 0.509 | 0.595 | 0.119 | 0.000 |
| Example33 | 1.37 | 1.00 | 0.125 | 0.103 | 0.11 | 0.614 | 0.667 | 0.104 | 0.000 | added-optical fibers, ytterbium was added throughout the first region 11a, and the active element was not added to the second region 11b. Further, aluminum, phosphorus, and boron were added to the first region to adjust the refractive index. The values below of the active element added-optical fibers of Examples 1 to 33 are shown in Table 2. A: the average value (wt %) of the concentration of ytterbium in the region of $0 \leq r \leq 0.1d$; B: the average value (wt %) of the concentration of the active element in the region of $0.1d < r \leq ra$; C: the average value (%) of the relative refractive index difference with respect to the inner cladding 12 in the region of $0 \leq r \leq 0.1d$; D: the relative refractive index difference (%) with respect to the inner cladding 12 in the region of r=0.2d; E: the relative refractive index difference (%) with respect to the cladding at the local maximum value position in the region of $0.2d < r \leq 0.9d$; F: the local maximum value

Comparative Examples 1 to 33

Figure 25:
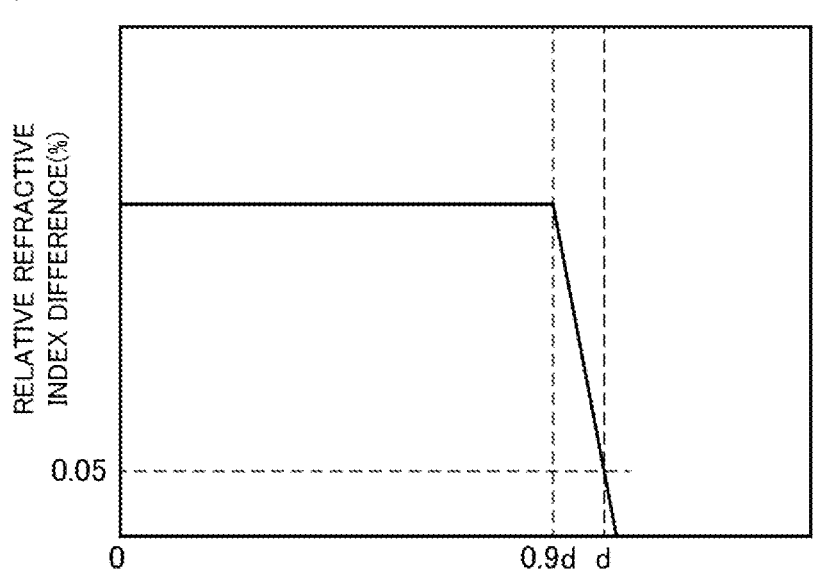
FIG. 25 is a diagram illustrating an example of a refractive index profile of a core of an active element added-optical fiber of a comparative example.

FIG. 25 is a diagram illustrating an example of a refractive index profile of a core of an active element added-optical fiber of a comparative example. In each comparative example, it is assumed that the relative refractive index difference with respect to the cladding in the region of $0 \leq r \leq 0.9d$ is constant and the relative refractive index difference gradually decreases from r=0.9d toward the outer peripheral side, and the relative refractive index difference with respect to the cladding is 0.05% in the region of r=d. This means that in the region of $0 \leq r \leq 0.9d$, the active element is added at a constant concentration, and the concentration of the active element gradually decreases from r=0.9d toward the outer peripheral side. The relative refractive index difference with respect to the cladding in the region of $0 \leq r \leq 0.9d$ in each comparative example was set to be the same as H: the average value of the relative refractive index difference with respect to the inner cladding 12 in the region of $0 \leq r \leq 0.9d$ of the corresponding example. Therefore, for example, the relative refractive index difference with respect to the cladding in the region of $0 \leq r \leq 0.9d$ in Comparative Example 1 is 0.141(%), which is the same value as H in Example 1. The simulation below was performed under such conditions.

Next, the effective cross-sectional area ($\mu m^2$) of the LP01 mode light in a case where light having a wavelength of 1070 nm propagates through the core of each of the active element added-optical fibers of Examples 1 to 33 and the active element added-optical fibers of Comparative Examples 1 to 33 was obtained by simulation. The results are shown in Table 3.

TABLE 3

|  | Example | Comparative Example |
|---|---|---|
| 1 | 397.2 | 336.2 |
| 2 | 439.2 | 352.7 |
| 3 | 433.1 | 346.8 |
| 4 | 429.9 | 341.7 |
| 5 | 437.5 | 346.0 |
| 6 | 401.5 | 354.2 |
| 7 | 389.5 | 347.5 |
| 8 | 434.9 | 344.2 |
| 9 | 401.6 | 341.2 |
| 10 | 393.6 | 337.8 |
| 11 | 405.9 | 341.9 |
| 12 | 403.9 | 337.8 |
| 13 | 383.0 | 362.3 |
| 14 | 391.4 | 351.8 |
| 15 | 438.8 | 345.0 |
| 16 | 425.2 | 344.2 |
| 17 | 404.5 | 348.3 |
| 18 | 405.0 | 345.0 |
| 19 | 413.0 | 344.2 |
| 20 | 409.8 | 341.8 |
| 21 | 434.0 | 344.4 |
| 22 | 427.2 | 346.8 |
| 23 | 403.2 | 335.2 |
| 24 | 392.8 | 355.5 |
| 25 | 404.9 | 357.7 |
| 26 | 397.2 | 362.5 |
| 27 | 384.5 | 332.9 |
| 28 | 402.3 | 336.9 |
| 29 | 401.7 | 330.2 |
| 30 | 412.7 | 389.4 |
| 31 | 401.6 | 379.8 |
| 32 | 894.6 | 890.8 |
| 33 | 1023.4 | 892.2 |

As shown in Table 3, the effective cross-sectional area of the LP01 mode light in the active element added-optical fibers of Examples 1 to 33 was larger than the effective cross-sectional area of the LP01 mode light in the active element added-optical fibers of corresponding Comparative Examples 1 to 33. This is considered to be because in the active element added-optical fibers of Examples 1 to 33, in the region of $0.2d<r<0.9d$, at least one local maximum value position at a relative refractive index difference higher than the average value of the relative refractive index difference in the region of $0<r<0.9d$ exists.

Further, the beam quality ($M^2$) of light emitted from the active element added-optical fibers in a case where light having a wavelength of 1070 nm propagates through the core of each of the active element added-optical fibers of Examples 1 to 33 and the active element added-optical fibers of Comparative Examples 1 to 33 was obtained by simulation. The results are shown in Table 4.

TABLE 4

|  | Example | Comparative Example |
|---|---|---|
| 1 | 1.32 | 1.89 |
| 2 | 1.28 | 1.76 |
| 3 | 1.3 | 1.84 |
| 4 | 1.33 | 1.88 |
| 5 | 1.27 | 1.9 |
| 6 | 1.28 | 1.92 |
| 7 | 1.28 | 1.75 |
| 8 | 1.32 | 1.83 |
| 9 | 1.31 | 1.87 |
| 10 | 1.32 | 1.9 |
| 11 | 1.26 | 1.93 |
| 12 | 1.29 | 1.78 |
| 13 | 1.3 | 1.81 |
| 14 | 1.25 | 1.85 |
| 15 | 1.28 | 1.77 |
| 16 | 1.26 | 1.91 |
| 17 | 1.29 | 1.84 |
| 18 | 1.34 | 1.89 |
| 19 | 1.33 | 1.94 |
| 20 | 1.34 | 1.79 |
| 21 | 1.32 | 1.81 |
| 22 | 1.35 | 1.8 |
| 23 | 1.33 | 1.85 |
| 24 | 1.32 | 1.77 |
| 25 | 1.35 | 1.91 |
| 26 | 1.29 | 1.83 |
| 27 | 1.3 | 1.89 |
| 28 | 1.27 | 1.79 |
| 29 | 1.26 | 1.88 |
| 30 | 1.30 | 1.88 |
| 31 | 1.28 | 1.88 |
| 32 | 1.28 | 2.03 |
| 33 | 1.34 | 2.09 |

As shown in Table 4, the values of the beam quality of the light emitted from the active element added-optical fibers of Examples 1 to 33 were smaller than the values of the beam quality of the light emitted from the active element added-optical fibers of corresponding Comparative Examples 1 to 33. That is, with the active element added-optical fibers of Examples 1 to 33, the deterioration of beam quality was suppressed as compared with the active element added-optical fibers of corresponding Comparative Examples 1 to 33.

Note that, in Examples 1 to 33 shown in Tables 2 to 4 in which the active element was ytterbium, the average value of the concentration of ytterbium in the region of $0 \leq r \leq 0.1d$ was 1.31 wt % or more and 2.86 wt % or less. Further, the average value of the concentration of ytterbium in the region of $0.1d<r \leq ra$ was 1.00 wt % or more and 2.25 wt % or less. Further, the average value of the relative refractive index difference of the core to the cladding in the region of $0 \leq r \leq 0.1d$ was 0.125% or more and 0.195% or less. Further, the relative refractive index difference of the core to the cladding in the region of $r=0.2d$ was 0.091% or more and 0.138% or less. Further, the relative refractive index difference with respect to the cladding at the local maximum value position in the region of $0.2d<r \leq 0.9d$ was 0.11% or more and 0.19% or less. Further, the average value of the relative refractive index difference to the cladding in the region of $0 \leq r \leq 0.9d$ was 0.104% or more and 0.156% or less. Further, the standard deviation of the relative refractive index difference of the region of $1.1ra<r \leq 0.9d$ was 0.004 or less.

Next, the relationship between the effective cross-sectional area of light propagating through the core of the active element added-optical fiber in which the local maximum value position where the refractive index is locally maximum exists in the core as described above and the effective cross-sectional area of light propagating through the core of the active element added-optical fiber having a step-type refractive index profile as illustrated in FIG. 25 in which the relative refractive index difference of the core with respect to the cladding is constant was examined by simulation.

Specifically, a plurality of sets of step-type active element added-optical fibers and active element added-optical fibers having a local maximum value, in which the relative refractive index difference of one active element added-optical fiber of the step-type active element added-optical fibers is the same as the average value of the relative refractive index difference of one active element added-optical fiber of a plurality of active element added-optical fibers having a local maximum value, was subjected to the above simulation. That is, an optical fiber set having a common average value was subjected to the simulation. Note that the common average value in each of the plurality of optical fiber sets is different for each optical fiber set.

In the above simulation, the effective cross-sectional area of each of the step-type active element added-optical fiber and the active element added-optical fiber having the local maximum value, which constitute the set described above, was calculated, and the difference between these effective cross-sectional areas was determined. Specifically, Simulation 1 of obtaining a difference in effective cross-sectional area using the active element added-optical fiber having a local maximum value formed so that the average value in the region where a distance r from the central axis of the core is 0.055d or more and 0.1d or less is equal to or more than the value of the relative refractive index difference at the local maximum value position, and Simulation 2 of obtaining a difference in effective cross-sectional area using the active element added-optical fiber having a local maximum value formed so that the average value in the region where the distance r is 0 or more and 0.1d or less is equal to or less than the value of the relative refractive index difference at the local maximum value position were performed.

Figure 26:
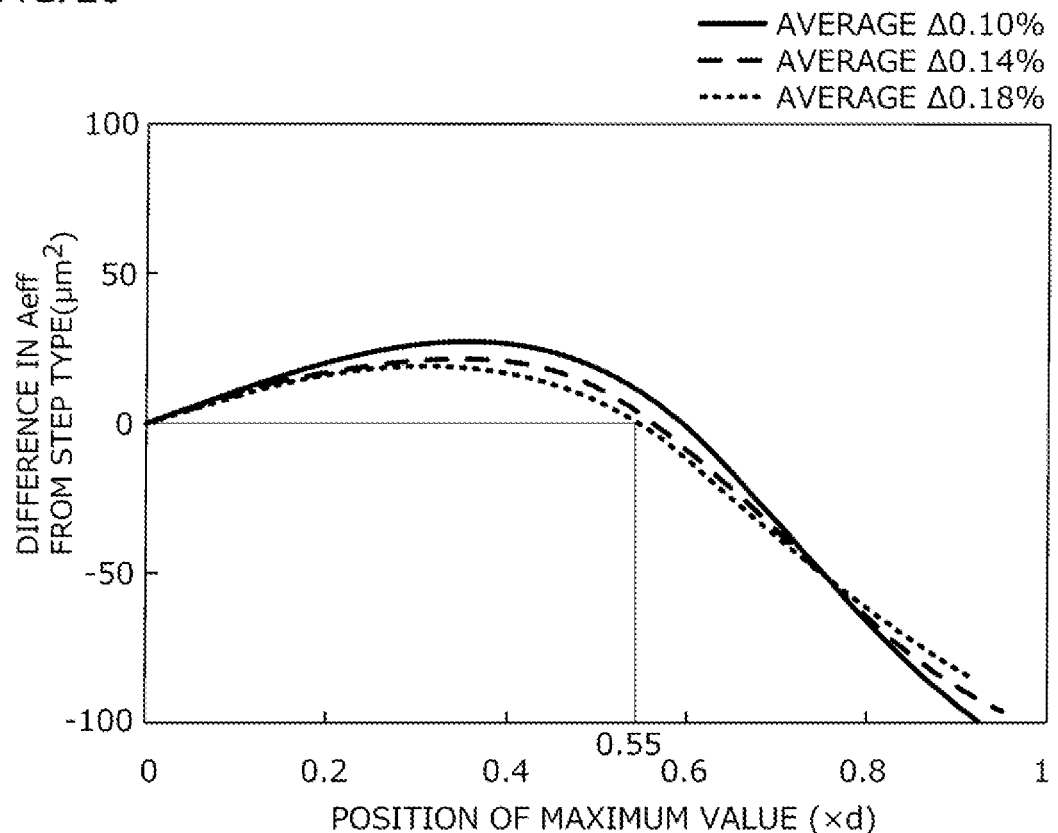
FIG. 26 is a diagram illustrating an example of a relationship between a difference between an effective cross-sectional area of the active element added-optical fiber of the present invention and an effective cross-sectional area of a step-type optical fiber and a local maximum value position in a core of the active element added-optical fiber of the present invention.
Figure 27:
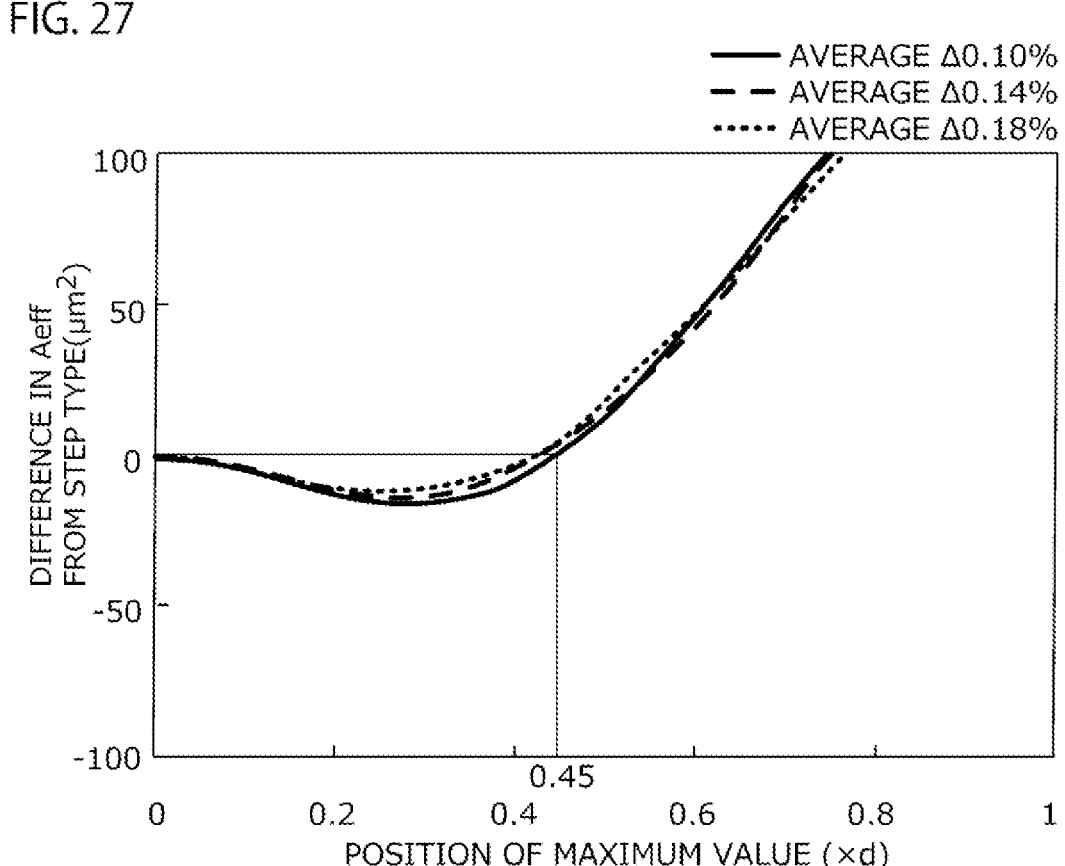
FIG. 27 is a diagram illustrating another example of a relationship between a difference between an effective cross-sectional area of the active element added-optical fiber of the present invention and an effective cross-sectional area of a step-type optical fiber and a local maximum value position in a core of the active element added-optical fiber of the present invention.

The results of Simulation 1 and Simulation 2 are illustrated in FIGS. 26 and 27, respectively. Note that FIGS. 26 and 27 illustrate the relationship between the local maximum value position and the difference in effective cross-sectional area when an average value A of the relative refractive index difference of the core of the active element added-optical fiber having the local maximum value is 0.10%, 0.14%, and 0.18%. Note that, as described above, the average value A of the relative refractive index difference of the core of the active element added-optical fiber having the local maximum value is equal to the relative refractive index difference of the core of the step-type optical fiber constituting the optical fiber set together with the active element added-optical fiber having the local maximum value.

As illustrated in FIG. 26, according to Simulation 1 using the active element added-optical fiber having the local maximum value in which the average value of the relative refractive index difference in the region of 0.055d or more and 0.1d or less is the local maximum value or more, it has been found that when the average value of the relative refractive index difference of the core is larger than 0% and 0.18% or less, when the local maximum value position is 0.55d or less, the effective cross-sectional area is larger than that in the case of the step-type optical fiber having the same relative refractive index difference, which constitutes the optical fiber set. That is, with such an active element added-optical fiber having a local maximum value, the effective cross-sectional area is increased, and stimulated Raman scattering can be further suppressed. Note that the case where the average value of the relative refractive index difference of the core is larger than 0% and 0.18% or less is a case where the refractive index of the core is a refractive index that is high enough to be capable of guide of light, and, for example, the average value of the relative refractive index difference of the core may be 0.05% or more and 0.18% or less.

As illustrated in FIG. 27, according to Simulation 2 using the active element added-optical fiber having the local maximum value in which the average value of the relative refractive index difference in the region of 0 or more and 0.1d or less is the local maximum value or less, it has been found that when the average value of the relative refractive index difference of the core is 0.10% or more, when the local maximum value position is 0.45d or more, the effective cross-sectional area is larger than that in the case of the step-type optical fiber having the same relative refractive index difference, which constitutes the optical fiber set. That is, with such an active element added-optical fiber having a local maximum value, the effective cross-sectional area is increased, and stimulated Raman scattering can be further suppressed. Note that, in Simulation 2, the upper limit of the average value of the relative refractive index difference that provides the effect of increasing the effective cross-sectional area is not particularly limited as long as the local maximum value position is 0.45d or more, but, for example, the upper limit of the average value of the relative refractive index difference may be set to 0.18%.

As described above, according to one or more embodiments of the present invention, an active element added-optical fiber, a preform for an active element added-optical fiber, a resonator, and a fiber laser device capable of suppressing deterioration of beam quality are provided, and are expected to be used in a laser device for machining or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An active element added-optical fiber comprising:
a core, having a radius d, including a first region and a second region, and configured to propagate light in a few modes, and
a cladding that surrounds an outer peripheral surface of the core without a gap, has a refractive index lower than a refractive index of the second region of the core, and propagates light in a few modes, wherein
the first region is a region from a central axis of the core to a radius ra and contains ytterbium as an active element that can be pumped by light,
the second region is a region to the radius d that surrounds the first region without a gap and contains a plurality of dopants, one of which is germanium,
the active element is not added to a region within the second region from a radius rc to the radius d,
the germanium is not added to a region within the first region from the central axis to a radius rb,
a concentration of the germanium is highest among the plurality of dopants,
the active element and the germanium are added to a first diffusion region from the radius rb to the radius rc, $0.1d < ra < d$, when a distance from the central axis of the core in a radial direction is r, in a region of 0.2d<r≤0.9d, there is at least one local maximum value position, whose refractive index is locally maximum and is higher than an average refractive index in a region of 0≤r≤0.9d, and the local maximum value position exists in a region of 0.4d<r≤ra.

2. The active element added-optical fiber according to claim 1, wherein in the first diffusion region, a concentration of the active element decreases with increasing radius, and the concentration of the germanium increases with increasing radius, and in the first diffusion region, at a first matching point where a concentration of the active element equals the concentration of the germanium, the concentration of the active element is 70% or less of an average concentration of the active element in a region from the central axis to a radius 0.5ra or less.

3. The active element added-optical fiber according to claim 1, wherein at least one up-dopant other than the active element that increases refractive index is added to a region from the central axis of the core to a radius rd in the second region, the up-dopant and germanium are added to a second diffusion region from the radius rb to the radius rd, in the second diffusion region, a concentration of the up-dopant decreases with increasing radius, and the concentration of the germanium increases with increasing radius, and at a second matching point in the second diffusion region where a total concentration of the up-dopant equals the concentration of the germanium, the total concentration of the up-dopant is larger than 0 and is 50% or less of an average concentration of the up-dopant in a region from the central axis to a radius 0.5ra or less.

4. The active element added-optical fiber according to claim 1, wherein a slope of a refractive index profile at the radius d of the core is −0.035%/μm or less.

5. The active element added-optical fiber according to claim 1, wherein the core has a step index-shaped refractive index profile, the core has a V-value of 5 or more and 12 or less, and 0.39d≤ra≤0.78d.

6. The active element added-optical fiber according to claim 1, wherein a standard deviation of a relative refractive index difference in a region of 1.1ra<r≤0.9d is 0.004 or less.

7. The active element added-optical fiber according to claim 1, wherein the local maximum value position exists in a region of 0.338d≤r≤0.614d.

8. The active element added-optical fiber according to claim 1, wherein 0.595d≤ra≤0.716d.

9. The active element added-optical fiber according to claim 1, wherein an average concentration of the active element in a region of 0≤r≤0.1d is higher than an average concentration of the active element in a region of 0.1d<r≤ra.

10. The active element added-optical fiber according to claim 1, wherein an average refractive index in the region of 0≤r≤0.1d is higher than a refractive index at r=0.2d.

11. The active element added-optical fiber according to claim 1, wherein an average refractive index in a region of 0.1d≤r≤0.8ra is higher than an average refractive index in a region of 1.1ra≤r≤0.9d.

12. The active element added-optical fiber according to claim 1, wherein an average refractive index in a region of 0.1≤r≤0.8ra is lower than an average refractive index in a region of 1.1ra≤r≤0.9d.

13. The active element added-optical fiber according to claim 1, wherein an average refractive index in a region of 0.1d≤r≤0.8ra is equivalent to an average refractive index in a region of 1.1ra≤r≤0.9d.

14. The active element added-optical fiber according to claim 1, wherein an average relative refractive index difference with respect to the cladding in a region of 0.055d≤r≤0.1d is equal to or more than a relative refractive index difference at the local maximum value position, an average relative refractive index difference of the core with respect to the cladding is larger than 0% and 0.18% or less, and the local maximum value position is at 0.55d or less.

15. A resonator comprising:

the active element added-optical fiber according to claim 1;

a first mirror configured to be optically coupled to the core of the active element added-optical fiber on one side of the active element added-optical fiber and reflect light having at least a part of wavelength of light emitted by the pumped active element; and a second mirror configured to be optically coupled to the core of the active element added-optical fiber on another side of the active element added-optical fiber and reflect light having at least a part of wavelength of the light reflected by the first mirror at a reflectance lower than a reflectance of the first mirror.

16. A fiber laser device comprising:

the active element added-optical fiber according to claim 1; and a light source configured to emit light that pumps the active element.

17. An active element added-optical fiber comprising:

a core, having a radius d, including a first region and a second region, and configured to propagate light in a few modes, and a cladding that surrounds an outer peripheral surface of the core without a gap, has a refractive index lower than a refractive index of the second region of the core, and propagates light in a few modes, wherein the first region is a region from a central axis of the core to a radius ra and contains ytterbium as an active element that can be pumped by light, the second region is a region to the radius d that surrounds the first region without a gap and contains a plurality of dopants, one of which is germanium, the active element is not added to a region within the second region from a radius rc to the radius d, the germanium is not added to a region within the first region from the central axis to a radius rb, a concentration of the germanium is highest among the plurality of dopants, the active element and the germanium are added to a first diffusion region from the radius rb to the radius rc, 0.1d<ra<d, when a distance from the central axis of the core in a radial direction is r, in a region of 0.2d<r≤0.9d, there is at least one local maximum value position, whose refractive index is locally maximum and is higher than an average refractive index in a region of 0≤r≤0.9d, an average concentration of the active element in a region of $0<r\leq0.1d$ is higher than an average concentration of the active element in a region of $0.1d<r\leq ra$, and an average refractive index in the region of $0\leq r\leq0.1d$ is higher than a refractive index at $r=0.2d$.

18. An active element added-optical fiber comprising:

a core, having a radius d, including a first region and a second region, and configured to propagate light in a few modes, and a cladding that surrounds an outer peripheral surface of the core without a gap, has a refractive index lower than a refractive index of the second region of the core, and propagates light in a few modes, wherein the first region is a region from a central axis of the core to a radius ra and contains ytterbium as an active element that can be pumped by light, the second region is a region to the radius d that surrounds the first region without a gap and contains a plurality of dopants, one of which is germanium, the active element is not added to a region within the second region from a radius rc to the radius d, the germanium is not added to a region within the first region from the central axis to a radius rb, a concentration of the germanium is highest among the plurality of dopants, the active element and the germanium are added to a first diffusion region from the radius rb to the radius rc, $0.1d<ra<d$, when a distance from the central axis of the core in a radial direction is r, in a region of $0.2d<r\leq0.9d$, there is at least one local maximum value position, whose refractive index is locally maximum and is higher than an average refractive index in a region of $0\leq r\leq0.9d$, and an average refractive index in a region of $0.1d\leq r\leq0.8ra$ is higher than an average refractive index in a region of $1.1ra\leq r\leq0.9d$.

19. An active element added-optical fiber comprising:

a core, having a radius d and including a first region and a second region, and a cladding that surrounds an outer peripheral surface of the core without a gap and propagates light in a few modes, wherein the first region is a region from a central axis of the core to a radius ra and contains ytterbium as an active element that can be pumped by light, the second region is a region to the radius d that surrounds the first region without a gap and contains a plurality of dopants, one of which is germanium, the active element is not added to a region within the second region from a radius rc to the radius d, the germanium is not added to a region within the first region from the central axis to a radius rb, a concentration of the germanium is highest among the plurality of dopants, the active element and the germanium are added to a first diffusion region from the radius rb to the radius rc, $0.1d<ra<d$, when a distance from the central axis of the core in a radial direction is r, in a region of $0.2d<r\leq0.9d$, there is at least one local maximum value position, whose refractive index is locally maximum and is higher than an average refractive index in a region of $0\leq r\leq0.9d$, and an average refractive index in a region of $0.1d\leq r\leq0.8ra$ is equivalent to an average refractive index in a region of $1.1ra\leq r\leq0.9d$.

\* \* \* \* \*